US012613788B2

(12) United States Patent
Balachandriah et al.

(10) Patent No.: US 12,613,788 B2
(45) Date of Patent: Apr. 28, 2026

(54) MACHINE LEARNING PIPELINE PERFORMANCE ACCELERATION WITH OPTIMIZED DATA ACCESS INTERFACES USING IN-MEMORY AND DISTRIBUTED STORE

(71) Applicant: HEWLETT PACKARD ENTERPRISE DEVELOPMENT LP, Spring, TX (US)

(72) Inventors: Sridhar Balachandriah, Bangalore (IN); Satish Kumar Mopur, Bangalore (IN); Lance Mackimmie Evans, Longmont, CO (US); Sherin Thyil George, Bangalore (IN); Kevan Rehm, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 430 days.

(21) Appl. No.: 18/302,279

(22) Filed: Apr. 18, 2023

(65) Prior Publication Data

US 2024/0354218 A1      Oct. 24, 2024

(51) Int. Cl.
*G06F 11/34* (2006.01)
(52) U.S. Cl.
CPC ...... *G06F 11/3495* (2013.01); *G06F 11/3433* (2013.01)
(58) Field of Classification Search
CPC ............. G06F 11/3433; G06F 11/3452; G06F 11/3495; G06N 20/00
USPC ........................................................ 702/186
See application file for complete search history.

(56) References Cited

U.S. PATENT DOCUMENTS

| | | | |
|---|---|---|---|
| 10,104,231 B2 * | 10/2018 | Blodgett ............. | H04M 3/5133 |
| 10,275,176 B1 | 4/2019 | Gold et al. | |
| 10,452,444 B1 | 10/2019 | Jibaja et al. | |
| 10,776,164 B2 * | 9/2020 | Zhao ..................... | G06N 3/084 |
| 10,817,392 B1 | 10/2020 | Mcauliffe et al. | |

(Continued)

FOREIGN PATENT DOCUMENTS

EP          3822785 A1      5/2021

OTHER PUBLICATIONS

Arthur Cole, "The success of AI lies in the infrastructure", available online at <https://venturebeat.com/ai/the-success-of-ai-lies-in-the-infrastructure>, Apr. 18, 2022, 6 pages.

*Primary Examiner* — John H Le
(74) *Attorney, Agent, or Firm* — Sheppard Mullin Richter & Hampton LLP

(57)          ABSTRACT

Systems and methods are provided for utilization of optimal data access interface usage in machine learning pipelines. Examples of the systems and methods disclosed herein include identifying data access interfaces comprising at least a first data access interface for a persistent storage distributed across a plurality of storage nodes and at least a second data access interface for an in-memory object store, and receiving, from a compute node, a data operation request as part of a machine learning pipeline. Additionally, performance metrics are obtained for the plurality of access interfaces, and based on a type of data operation request, the data operation is executed using a data access interface selected from the plurality of data access interface based on the performance metrics and providing an object handle to the compute node.

20 Claims, 10 Drawing Sheets

(56)  References Cited

U.S. PATENT DOCUMENTS

| | | | |
|---|---|---|---|
| 11,080,111 B1 | 8/2021 | Perelygin et al. | |
| 2018/0121288 A1* | 5/2018 | Khadiwala | G06F 11/1092 |
| 2021/0132852 A1 | 5/2021 | Liu et al. | |
| 2021/0149734 A1 | 5/2021 | Gurfinkel et al. | |
| 2021/0389883 A1 | 12/2021 | Derryberry et al. | |
| 2022/0222397 A1 | 7/2022 | Jain et al. | |

\* cited by examiner

300

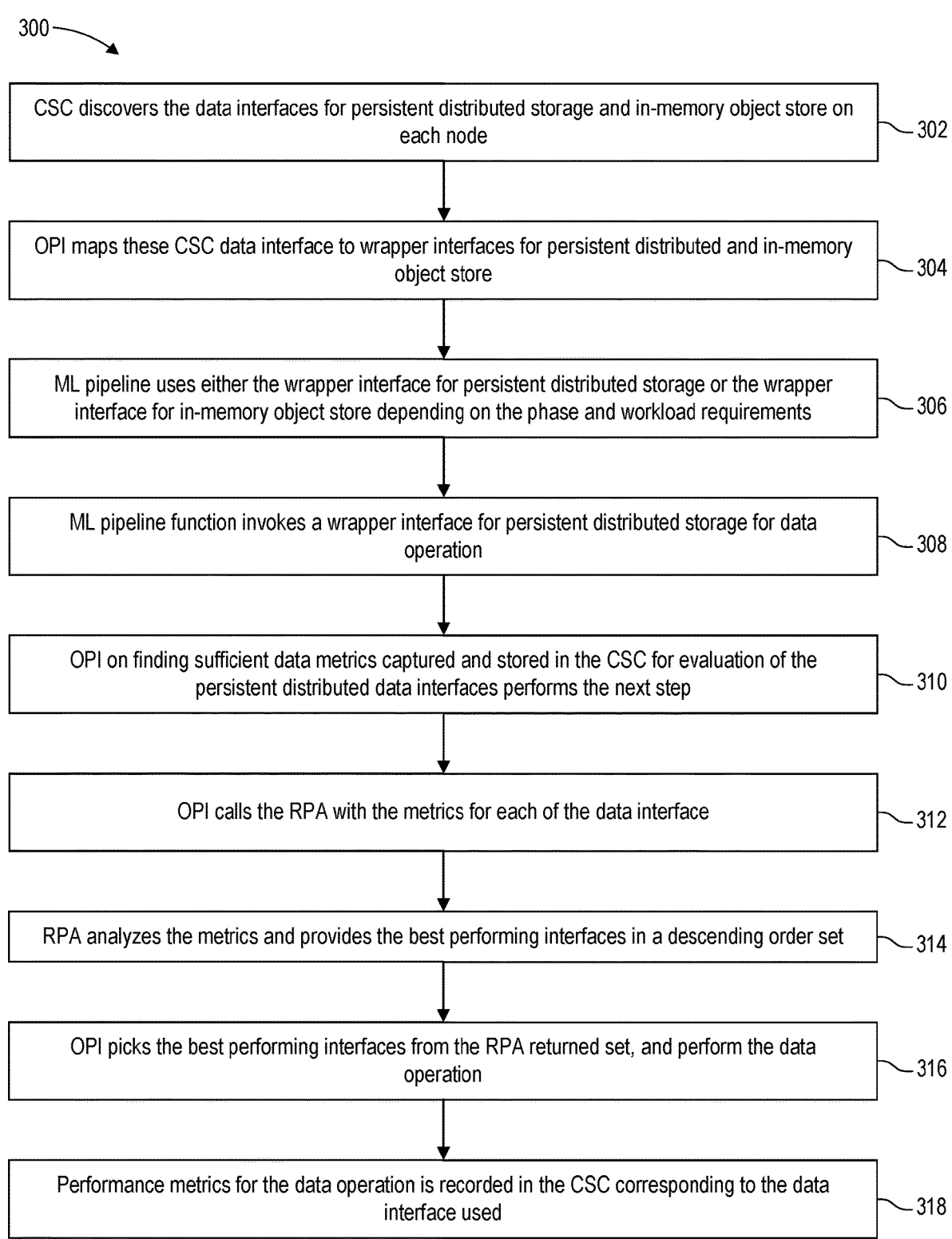

| CSC discovers the data interfaces for persistent distributed storage and in-memory object store on each node | 302 |

| OPI maps these CSC data interface to wrapper interfaces for persistent distributed and in-memory object store | 304 |

| ML pipeline uses either the wrapper interface for persistent distributed storage or the wrapper interface for in-memory object store depending on the phase and workload requirements | 306 |

| ML pipeline function invokes a wrapper interface for persistent distributed storage for data operation | 308 |

| OPI on finding sufficient data metrics captured and stored in the CSC for evaluation of the persistent distributed data interfaces performs the next step | 310 |

| OPI calls the RPA with the metrics for each of the data interface | 312 |

| RPA analyzes the metrics and provides the best performing interfaces in a descending order set | 314 |

| OPI picks the best performing interfaces from the RPA returned set, and perform the data operation | 316 |

| Performance metrics for the data operation is recorded in the CSC corresponding to the data interface used | 318 |

FIG. 3

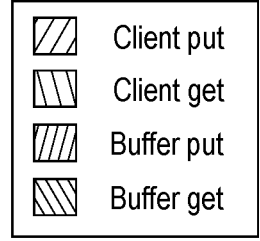
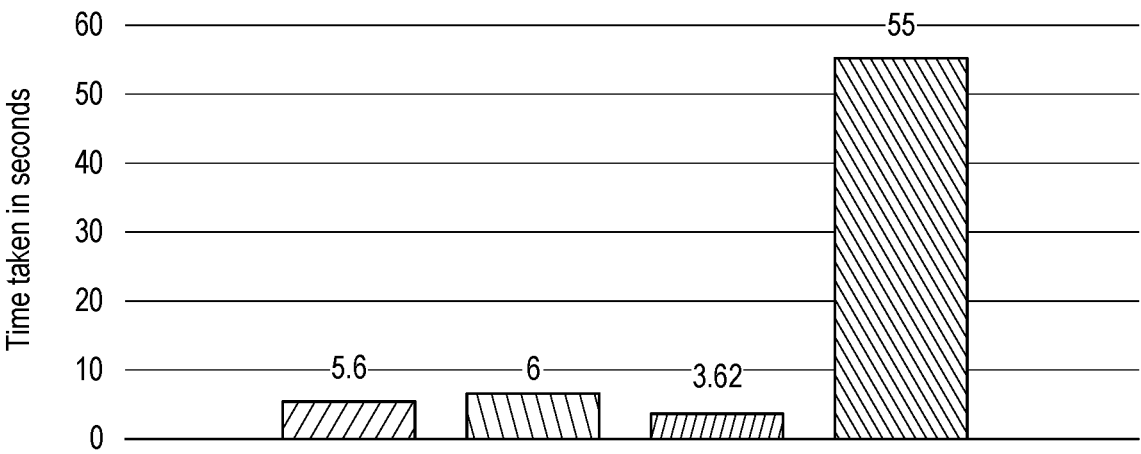
FIG. 7
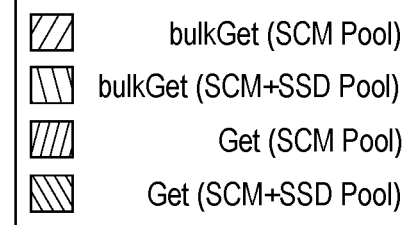
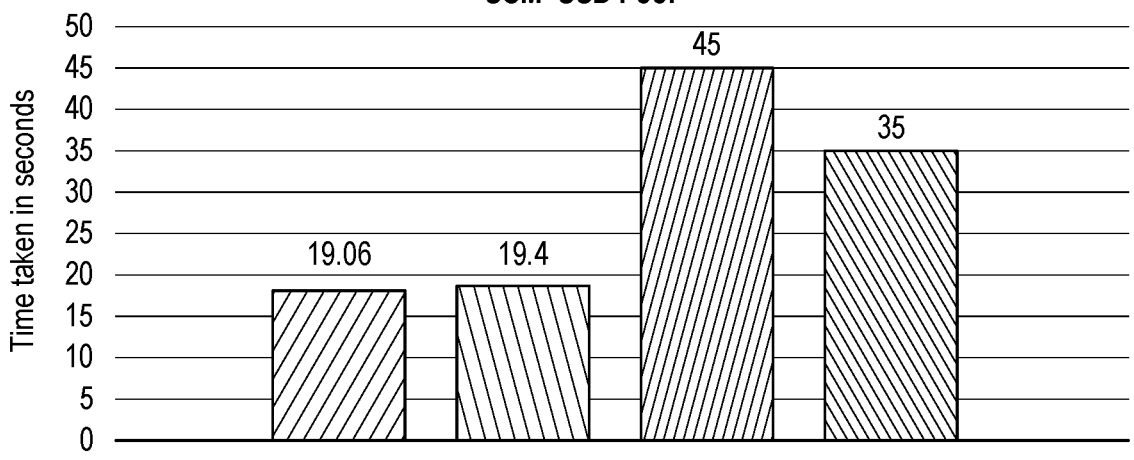
FIG. 8

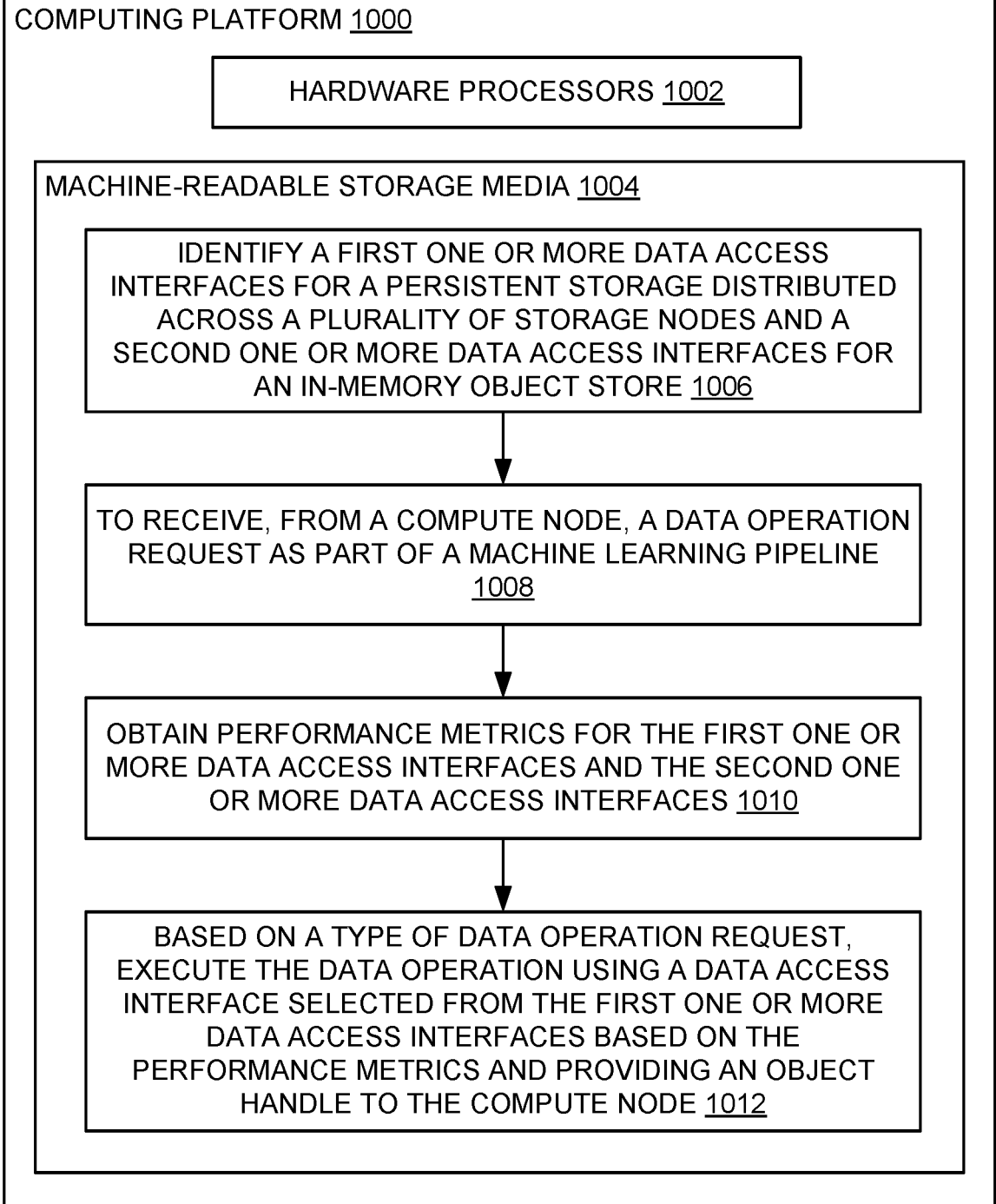

COMPUTING PLATFORM 1000

HARDWARE PROCESSORS 1002

MACHINE-READABLE STORAGE MEDIA 1004

IDENTIFY A FIRST ONE OR MORE DATA ACCESS INTERFACES FOR A PERSISTENT STORAGE DISTRIBUTED ACROSS A PLURALITY OF STORAGE NODES AND A SECOND ONE OR MORE DATA ACCESS INTERFACES FOR AN IN-MEMORY OBJECT STORE 1006

TO RECEIVE, FROM A COMPUTE NODE, A DATA OPERATION REQUEST AS PART OF A MACHINE LEARNING PIPELINE 1008

OBTAIN PERFORMANCE METRICS FOR THE FIRST ONE OR MORE DATA ACCESS INTERFACES AND THE SECOND ONE OR MORE DATA ACCESS INTERFACES 1010

BASED ON A TYPE OF DATA OPERATION REQUEST, EXECUTE THE DATA OPERATION USING A DATA ACCESS INTERFACE SELECTED FROM THE FIRST ONE OR MORE DATA ACCESS INTERFACES BASED ON THE PERFORMANCE METRICS AND PROVIDING AN OBJECT HANDLE TO THE COMPUTE NODE 1012

FIG. 10

MACHINE LEARNING PIPELINE PERFORMANCE ACCELERATION WITH OPTIMIZED DATA ACCESS INTERFACES USING IN-MEMORY AND DISTRIBUTED STORE

BACKGROUND

The use of Artificial Intelligence (AI) and Machine Learning (ML) has spread through many industries such as healthcare, manufacturing, finance, and life science, and deep learning with large datasets is now a main technology for solving real-world problems in such industries. AI and ML architectures are constantly evolving through implementation by advancement in software and hardware that can offer benefits in performance gains throughout ML workflows.

An ML workflow defines phases implemented during a ML project and consists of pipelines that orchestrate the flow of data into, and output from, the ML workflow. Each pipeline can include the phases with workloads, such as, but not limited to, data ingestion, pre-processing, model training, and inference. However, these workloads exhibit varying characteristics. In one example, the workloads can be exhibit varying data quality characteristics, such as varying dataset sizes (e.g., mebibyte (MiB) to pebibyte (PiB)), broad sets of data formats (e.g., images, text, numerical, tabular, etc.), and different attributes (e.g., unstructured, semi-structured, and structured). In another example, workloads can exhibit varying input/output (I/O) characteristics. For example, a bandwidth-intensive read/write may be observed during a data ingestion stage, a read-intensive process may be observed during data pre-processing stage, shuffled-intensive random read processes may be observed during a distributed training stage, and low-latency may be observed during an inference stage on streaming data.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 is a flow diagram of an example process for optimizing data access interface usage in accordance with implementations disclosed herein.

FIGS. 6-9 provide simulated graphical representations of results based on a simulation of the workflow interface optimization according to an example implementation.

FIG. 10 is an example computing component that may be used to implement various features of optimizing data access interface usage in accordance with the implementations disclosed herein.

Figure 1:
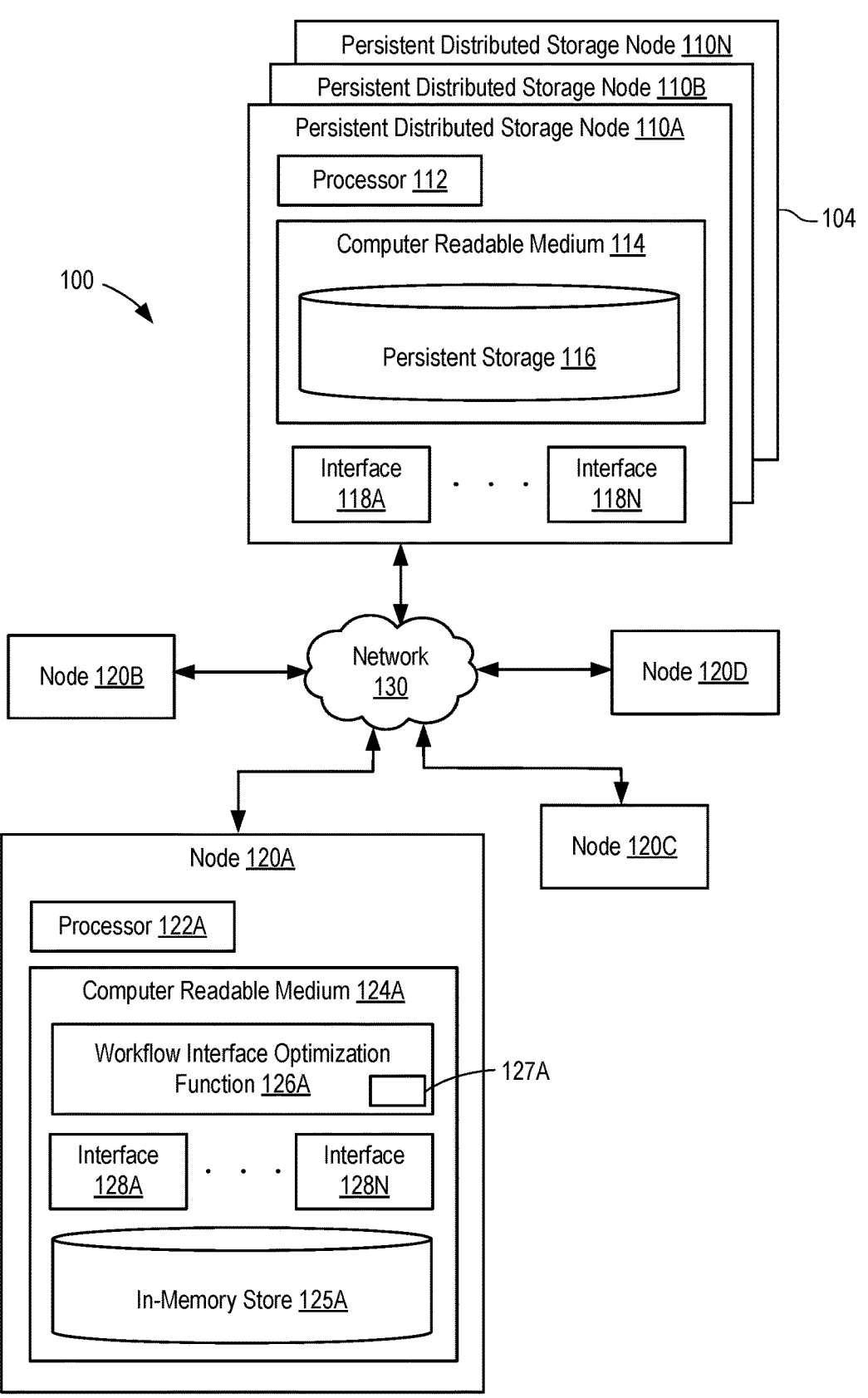
FIG. 1 illustrates a system for workflow interference optimization, in accordance with implementations of the disclosure.

The figures are not exhaustive and do not limit the present disclosure to the precise form disclosed.

DETAILED DESCRIPTION

As alluded to above, ML pipelines are made up of phases having workloads that exhibit varying characteristics. A number of ML pipelines can be executed concurrently on AI platform infrastructures, which can result in challenges in the execution of a ML workflow. One such challenge relates to constraints in memory capacity. For example, ML training datasets may typically exceed a capacity of the memory—such as the dynamic random access memory (DRAM)—of an AI infrastructure. As a result, critical ML workloads may fail intermittently due to resource constraints, such as unavailable memory. Another challenge can relate to utilization of graphical processing units (GPUs) due to numerous ML pipelines running concurrently. For example, in an ML pipeline, there may be a need to continuously feed data into a GPU for ML workloads, such as during a model training phase. However, if a data processing, prior to feeding to the GPU, monopolizes CPU resources (e.g., computation power and time) during a pre-processing phase, data ingestion phase, and the model training phase then the GPU may be force to wait for I/O. This bottle neck at the model training phase can lead to stalls in the ML workflow as other downstream phases are also forced to wait. In yet another example, numerous concurrently executed ML pipelines can cause data redundancy and duplication challenges within ML workflows. For example, ML pipelines can be repeatedly executed during a distributed (also referred to as federated) training, and each repetition can generate data feature sets. As a result, duplicated or redundant data feature sets may be generated and stored, which can result inefficient utilization of storage space in memory.

In-memory object stores have been used in ML pipelines to improve the utilization of memory. In-memory object stores can function to hold data objects in a shared memory infrastructure. In-memory object stores can store data on volatile random-access memory (RAM). However, degradation in performance can occur during remote access of data objects across compute nodes due to slow networks or protocol overhead. Performance gains can be achieved when the data objects in the in-memory object store are accessed from local in-memory stores (such as DRAM) using zero-copy ("zero-copy", as used herein, refers to computer operations in which the CPU does not perform the task of copying data from one memory area to another) techniques utilized in operations executed by a node.

Persistent distributed storage (referred to herein as "persistent distributed storage") have also been used in ML pipelines to alleviate data duplication. Persistent distributed storage provides DRAM-like access to data stored in a non-volatile memory infrastructure, similar to non-volatile random-access memory (NVRAM). Persistent distributed storage may expose various data access interfaces to a compute node for the varying characteristics exhibited by workloads. For example, a persistent distributed storage may have a multiplicity of data access interfaces through which data can be read and/or written. The persistent distributed storage can expose these data access interfaces by revealing the existence of these data access interfaces to external systems for performing read and/or write data operations by providing access thereto. In an illustrative example, a data access interface operating under the nonvolatile memory express (NVME) solid-state driver (SSD) transport protocol may be provided for read/write data operations executed on large data sets, while another interface in the distributed memory may be provided for read/write data operations on small data sets. Using an interface that is optimally selected based on the workload characteristics can help to augment performance. For example, Distributed Asynchronous Object Storage (DAOS), which is an open-source object store, exposes a bulk data access interface and a granular data access interface (among other interfaces) that can be used to fetch data objects. Using the bulk data access interface to fetch an entire Key-Value (or object) store held in the persistent distributed storage can yield faster data access as compared to iterating over the Key-Value store using the granular data access interface.

Persistent distributed storage and in-memory object stores comprise a multiplicity of write/store and read/fetch data access interfaces that can be used effectively for addressing the various AI platform infrastructure challenges. However, performance problems leading to GPU stalls, non-optimal usage of memory, and ineffective use of storage space can occur when utilization of data access interfaces for the persistent distributed storage and/or in-memory object stores is not optimized. Further performance challenges can occur where a memory consuming compute node may not effectively use the in-memory object store and persistent distributed storage, and/or duplicative data may be provided for different memory consuming processes on each node that each need access to the same data. An example of a non-effective use of a persistent distributed memory storage is a case where a granular data access interface is used, where a bulk data access interface would be optimal, as described above. An example of non-effective use of an in-memory object store is described in connection with FIG. 7 below.

Various approaches have been made in an attempt to address the above challenges in memory utilization. One such approach offers an in-memory data store with low-latency and high-throughput storage. However, in this approach a user needs to configure a maximum memory limit for in-memory usage. An improper setting can return an out-of-memory error for write data operations if the memory capacity is exceeded. This approach may support a persistent distributed storage, it does not provide a way to efficiently handle the data duplication problem.

Another approach has been provided that supports an in-memory object store capable of sharing data structures among multiple operations simultaneously through an application programming interface (API). However, in this approach, compute nodes accessing a shared storage must run on the same machine as the in-memory object store, and hence do not support distributed access across machines.

Yet another approach, uses a similar API enabled in-memory object functionality with additional remote object access across compute nodes over an Ethernet connection. However, this approach does not support direct distributed data store access, as it has implemented using an ownership concept. In this approach, an owning compute node's operation must fetch data from a local store, then transfer the data to the requesting operation of a different compute node. This data movement can exhibit high latency, data duplication, and excessive consumption of memory.

There are other approaches that offer zero-copy resource management for backend data stores as part of the AI workflows. However, these approaches does not provide a well-integrated in-memory object store based solution for the zero-copy access of the data that optimizes data access interface.

Implementations of the technology disclosed herein address the above technical shortcomings by providing an architecture that can discover a plurality of data access interfaces for accessing an in-memory object store and a persistent distributed storage, and selecting one of the plurality of data access interfaces for use that is optimal for a workload being performed. The architecture can be provided at a node in an AI infrastructure that is executable to select an data access interface and execute a data operation as part of the workload on the selected data access interface. Implementations disclosed herein comprise a common store configuration (CSC) module, which can discover and record data access interfaces exposed by the persistent distributed storage and the in-memory object store available on a per node basis. CSC module can also be utilized to record performance metrics for each data access interface. An optimized performance interface (OPI) module can be provided as a wrapper for interfacing with the distributed store and the in-memory object store. The OPI module can interact with the CSC module to obtain a list of available data access interfaces and metrics corresponding to each available data access interface, request a best-performing data access interface for use in performing the workload from a Resource Performance Analyzer (RPA) module, and execute the data operation on an optimal data access interface selected from the recommended data access interface. The RPA module can recommend one or more best-performing data access interface differentiating performance of the plurality of data access interfaces from analysis of the metrics and return the one or more best-performing data access interfaces to the OPI module. In an illustrative implementation, the RPA can differentiate performance of the one or more best-performing data access interface based on a moving average of each metric with crossover and slope detection.

The OPI module, according to an example implementation of the disclosed technology, can host a zero-copy control engine that configures the wrapper interface to minimize data duplication from parallel data operations (e.g., data operations reading the same data by a number of processes on a compute node). For example, the zero-copy control engine can be configured to synchronize parallel data operations through retrieval data objects from the persistent distributed storage and loading of the data on to an in-memory object store for a first data operation, and providing access to zero-copy data (sometimes referred to herein as pointers or object handles) that point subsequent data operations to the data objects in the in-memory object. For example, where multiple read data operations are requested for the same data, the read data operation can be performed for a first data operation that reads the data object from the persistent distributed storage and then stores it in the in-memory object store, while subsequent read data operations result in passing object handles from the in-memory object store that point to the data objects stored in the persistent distributed storage. Thus, when a data operation requesting the data object is issued from the same compute node, object handles can be obtained and provided to requesting data operation for accessing the data from the in-memory store, instead of reading from the distributed object store for repeated operations on the same data. Thus, the zero-copy control engine can function to read data from the persistent distributed storage and then have multiplicity of processes within the node to access the same data without having to copy data into multiple memory locations, thereby rescinding the duplicate footprint.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates a system 100 for workflow interference optimization, in accordance with implementations of the disclosure. The system 100 may comprise compute nodes 120A-D (collectively referred to herein as "compute nodes 120" in the plural or "node 120" in the singular) in communication with a persistent distributed storage system 104 via network 130. Persistent distributed storage system 104 may be distributed across a plurality of persistent distributed storage nodes, which are illustrated in this example as persistent distributed storage nodes 110A-110N (collectively referred to herein as "persistent distributed storage nodes 110" in the plural or "persistent distributed storage node 110" in the singular) with persistent distributed storage node 110A provided as an illustrative example of each storage node. Compute nodes 120 may each comprise one or more processors and persistent distributed storage nodes may comprise one or more processors. Each compute node 120 may comprise computer readable medium and persistent distributed storage node 110A may comprise computer readable medium 114. Such computer readable media may comprise one or more functions, as discussed herein. As an example of each node 120, node 120A is shown having a processor 122A and computer readable medium 124A. As an example of each node 110, node 110A is shown having a processor 112 and computer readable medium 114. The system 100 illustrates an example of a distributed environment, for example, where data operations (e.g., phases of a ML pipeline) can be executed on multiple compute node 110, and each compute node 110 has a local in-memory object store and is connected to persistent distributed storage system 104.

Processor(s) 122A and/or 112 may each represent one or more CPUs, GPUs, graph semiconductor-based microprocessors, and/or other hardware devices suitable for retrieval and execution of instructions stored in computer readable medium (media) 124A and/or 114. Processor(s) 122A and/or 112 may each fetch, decode, and execute instructions to control processes or operations for optimizing the system during run-time. As an alternative or in addition to retrieving and executing instructions, processor(s) 112, and/or 122A-D may each include one or more electronic circuits that include electronic components for performing the functionality of one or more instructions, such as a field programmable gate array (FPGA), application specific integrated circuit (ASIC), or other electronic circuits. As used herein, for convenience, the various instructions may be described as performing an operation, when, in fact, the various instructions program processor(s) 122A and/or 112 to perform the operation. Similarly, where a computing device is disclosed as performing an operation, in fact the computing device's associated processor(s) perform the operation upon execution of associated instructions.

Computer readable medium (media) 124A and/or 114 may each comprise a random access memory (RAM), cache, and/or other dynamic storage devices, coupled to a bus for storing information and instructions to be executed by an associated processor(s) 122A and/or 112. Computer readable medium (media) 124A and/or 114 also may each be used for storing temporary variables or other intermediate information during execution of instructions to be executed by an associated processor(s) 122A and/or 112. Such instructions, when stored in storage media accessible to an associated processor(s) 122A and/or 112, render nodes 120 (sometimes referred to herein as compute nodes) and/or persistent distributed storage node 110A into special-purpose machines that are customized to perform the operations specified in the instructions.

In addition, computer readable medium (media) 124A and/or 114 may each comprise an electronic, magnetic, optical, or other physical storage device that contains or stores executable instructions. Thus, computer readable medium (media) 124A and/or 114 may each comprise, for example, Random Access Memory (RAM), dynamic RAM (DRAM), non-volatile RAM (NVRAM), an Electrically Erasable Programmable Read-Only Memory (EEPROM), a storage device, an optical disc, persistent memory and the like. In an illustrative example, computer readable medium 124A may comprise RAM and/or DRAM for volatile storage of data, while computer readable medium 144 comprises persistent memory capable of providing RAM like access in a non-volatile infrastructure. As described in detail below, computer readable medium (media) 124A and/or 114 can be encoded with executable instructions.

In an example implementation, computer readable medium 124A comprises an in-memory store 125A. The in-memory store 125A can function to store variables, data, or other information accessed and/or generated during an executed workload using volatile memory, such as DRAM and/or RAM. In an example implementation, in-memory store 125A can function as in-memory key-value (or object) data store. The in-memory store 125A may be associated with one or more data access interfaces, illustratively depicted as a plurality of data access interfaces 128A-128N (sometimes referred to herein as a second one or more data access interfaces). Example data access interfaces of in-memory store 125A for data operations such as read/write include, but are not limited to, granular access interface, bulk access interface, interface to access remote data stores in an in-memory store cluster, and so on. In an example implementation, data access interfaces 128A-128N can be used for a number of data types (e.g., objects, blobs, custom training transformed data, data slices and so on) and data sizes (e.g., from MiB to PiB and intermediary sizes therebetween). In some implementations, the data types can be custom objects (e.g., data plus metadata), which can be ML pipeline transformed elements that will be used for other pipeline elements like training. As further discussed in relation to FIGS. 2 and 3, disparate data access interfaces can be exposed for utilization by processor(s) 122A in accessing data stored in in-memory store 125A for executing instructions stored in computer readable medium 124A. An in-memory store 125A can be implemented as key-value store for data objects, which is configured to hold immutable objects in shared memory so that they can be accessed efficiently by many nodes across process boundaries In an illustrative example, an open source Apache Plasma in-memory object store can be implemented as computer readable medium 125A for data access across process boundaries. Other example platforms that can be used to implement computer readable medium 125A, include but are not limited to, Ray Plasma, Apache Plasma, Redis, memcached, and so on. While the forgoing description is provided with respect to node 120A, each node 120 may comprise computer readable medium that is similarly suited to offer the same or similar functionality.

In various implementations disclosed herein, the in-memory store 125A may be used for node specific for zero-copy access. In the case where in-memory store 125A is provided as DRAM, the DRAM may be limited. For example, large ML datasets cannot fit into RAM for processing and training due to memory capacity limitations. The data set and intermediary data results in the ML pipeline can thus be saved in the distributed persistent storage 104. While some in-memory stores provide for cluster based distributed access, these access requests across compute nodes can get caught in network latencies and fault tolerance problems. Thus, implementations disclosed herein can use the in-memory store 125A for zero-copy synchronization of processes within a compute node 120A, while the data is retrieved from the persistent distributed storage system 104 over a high speed network. This functionality provides for the much faster synchronization of data across compute nodes compared to in-memory clustered object stores.

In the illustrative example of FIG. 1, computer readable medium 114 comprises a persistent storage 116. As used herein, "persistent storage" refers to any non-volatile storage medium capable of retaining data after power to the device is shut off. Distributed persistent storage 116 can function to store variables, data, or other information accessed and/or generated during an executed operation. In an example implementation, distributed persistent storage 116 can function to store key-value (or object) data. The distributed persistent storage 116 may be associated with one or more data access interfaces, illustratively depicted as a plurality of data access interfaces 118A-118N (sometimes referred to herein as a first one or more data access interfaces) In a case where persistent distributed storage system 104 is implemented as DAOS, data access interfaces can include, but are not limited to, a block API, a distributed file system (DFS) API, through a pythonic API (e.g., pyDAOS), and so on. In an example implementation, data access interfaces 118A-118N provide for interfacing nodes 120 to the underlying distributed persistent storage 116 for storing data for workloads executed by the nodes 120, such as data pertaining to various phases of an ML pipeline. As further discussed in relation to FIGS. 2 and 3, disparate data access interfaces can be exposed for utilization by the nodes 120 in accessing data stored distributed persistent storage 116 for executing performing operations by the nodes 120. Persistent distributed storage node 110A can provide high bandwidth, low latency, and high I/O operations per second (IOPS) storage containers. In an illustrative example, persistent distributed storage node 110A can be implemented as a Distributed Asynchronous Object Storage (DAOS) system, which is an open source software-defined scale-out persistent object store. Other example platforms that can be used to implement distributed persistent storage 116 as part of persistent distributed storage system 104, include but are not limited to, VAST data storage, WEKA storage, and so on.

Each node also comprises a workflow interface optimization function, such as workflow interface optimization function 126A of node 120A. With reference to node 120A as an illustrative example of nodes 120, workflow interface optimization function 126A can be configured to optimize utilization of data access interfaces for accessing memory of node 120A while executing an operation 127A. Operation

127A, which can be provided as executable instructions stored in computer readable medium 124A, may be one or more data operations executed as part of a workload of an application and/or phase of a ML pipeline. In one example, operation 127A may be representative of a write data operation executed by node 120A to store data in in-memory store 125A, one or more persistent distributed storage nodes 110 of the persistent distributed storage system 104, or any data store available. In another example, operation 127A may be representative of a read data operation executed by node 120A to access or fetch data held in-memory store 125A, one or more persistent distributed storage nodes 110 of the persistent distributed storage system 104, or any data store available. In some examples, operation 127A may comprise a number of operations, such as one or more write data operations, one or more read data operations, or a combination thereof.

In operation, workflow interface optimization function 126A can be configured to identify a multiplicity of data access interfaces exposed by persistent distributed storage system 104 and in-memory store 125A for utilization in performing operation 127A. In the case of a read data operation, workflow interface optimization function 126A can be configured to select a data access interface from the multiplicity of identified data access interfaces (e.g., data access interfaces 128A-128N and data access interfaces 118A-118N) that is optimal for use in fetching (e.g., accessing and/or retrieving) data from a corresponding store according to operation 127A. That is, for example, workflow interface optimization function 126A can select an optimal data access interface for accessing data stored in distributed persistent storage 116 through the interfaces exposed by nodes 110 of the persistent distributed storage system 104 or in-memory store 125A. In the case of a data write operation, workflow interface optimization function 126A can be configured select a data access interface from the multiplicity of identified data access interfaces that is optimal for writing (e.g., storing) data into a corresponding store according to operation 127A. That is, for example, workflow interface optimization function 126A can select an data access interface for storing data in distributed persistent storage 116 or in-memory store 125A.

In the disclosed example, system 100 may be implemented as an AI platform for executing ML workflows and pipelines. Nodes 120 may be an example of a cluster of nodes that can be executed to perform distributed ML workflows. In this example, operation 127A may be operations for executing workloads as part of one or more ML pipelines of the ML workflow. As such, computer readable medium for each node 120 may store instructions for executing phases of ML pipelines as operations, which the processors of each node can execute to perform the phases in a distributed or federated manner. Workflow interface optimization functions of each node 120 can operate to optimize data access interface utilization on a node-by-node basis in executing the ML workflow, which can provide for accelerated performance in executing the entire ML workflow due to efficient usage of storage device data access interfaces.

Figure 2:
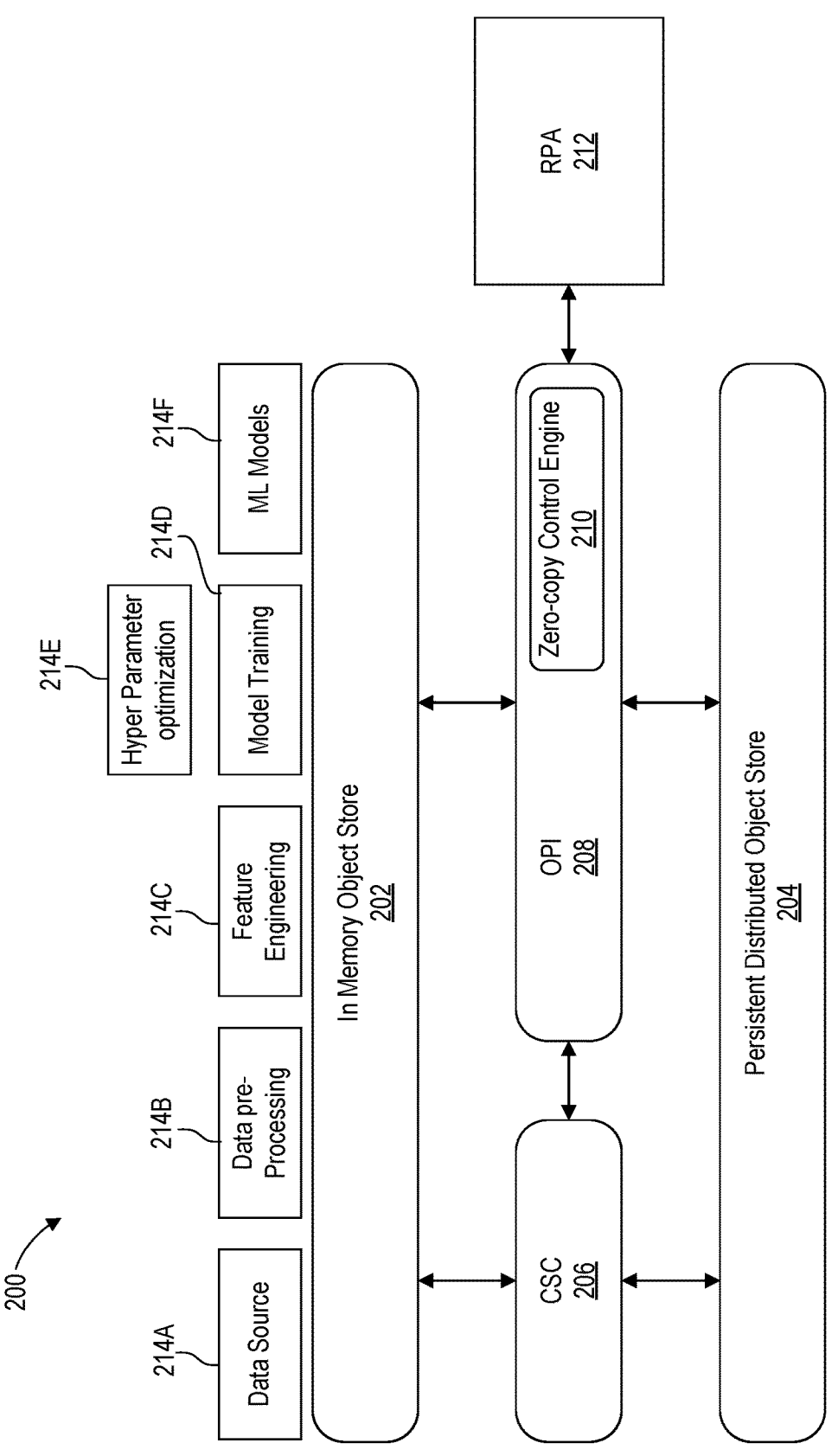
FIG. 2 illustrates an example workflow interface optimization architecture, in accordance with examples disclosed herein.

FIG. 2 illustrates an example workflow interface optimization architecture 200, in accordance with examples disclosed herein. Architecture 200 may be an example implementation of workflow interface optimization function 126A of FIG. 1, which can be used for optimizing data access interface utilization in executing operation 127A according to an example implementation disclosed herein.

Workflow interface optimization architecture 200 comprises a common store configuration (CSC) module 206 that is communicably coupled (e.g., wired or wireless communication via network 130) to an in-memory distributed object store 202 and a persistent distributed object store 204. Persistent distributed object store 204 may be an example implementation of persistent distributed storage system 104 of FIG. 1. In-memory distributed object store 202 and persistent distributed object store 204 may be example implementations of in-memory store 125A and distributed persistent storage 116, respectively. Workflow interface optimization architecture 200 also comprises an optimized performance interface (OPI) module 208 communicably coupled to CSC module 206 and a resource performance analyzer (RPA) module 212.

The CSC module 206 can be configured to discover and record a multiplicity of data access interfaces for the persistent distributed storage (e.g., data access interfaces 128A-128N) and in-memory object stores (e.g., data access interfaces 118A-121N) available on a per node basis. As such, CSC module 206 may function as a bookkeeping module of workflow interface optimization architecture 200. For example, in the case of persistent distributed object store 204, the underlying storage medium (e.g., as persistent storage 116 encompassing multiplicity of storage nodes 110 of persistent distributed storage system 104), can be exposed to the CSC module 206 as abstract persistent volumes via utilization of a suite of container storage interfaces ("CSIs") that are able to interface with local storage media of a node executing the CSC module 206 via the utilization of a first suite of data access interfaces (e.g., remote direct memory access (RDMA), non-volatile memory express (NVME), NVME SSD Transport Protocol, Transmission Control Protocol (TCP), etc.). Similarly, in the case of in-memory object store 202, the underlying storage medium (e.g., as in-memory store 125A) can be exposed to the CSC module 206 as abstract memory store interfaces to give access to the volatile memory (e.g., DRAM and/or RAM) of a compute node (e.g., node 120A) executing the CSC module 206 via the utilization of a second suite of data access interfaces (e.g., granular access interface such as (get_object, put_object), bulk access interface (get_all_objects, put_all_objects), interface to access remote stores in an in-memory store cluster (search_get_object), and so on). The exposed data access interfaces can be identified by CSC module 206 and recorded in a computer readable medium.

CSC module 206 can also obtain metrics for each of the exposed data access interfaces, which can be recorded and stored on a per data access interfaces basis. The persistent volumes in the persistent distributed object storage system 204 may expose performance metrics regarding the underlying storage media with the storage type matching the persistent volume and data access interface. Likewise, the in-memory object store 202 may expose metrics data through separate telemetry interfaces. Exposed metrics may include telemetry data corresponding to each data access interface, such as but, not limited to, memory usage, latency details on a data size basis, latency details on a data access interface basis, bandwidth, data transfer rates, etc. CSC module 206 can obtain metrics over time and tag each metric with a timestamp according to when the metric was recorded, along with an identifier of a corresponding data access interface. Metrics can be recorded as data points sampled over time, with timestamps indicative of the time at which a data point was obtained by CSC module 206. Additionally, CSC module 206 may also record the performance metrics for each of the data access interfaces used by calculating the latency times and record the same.

In an example implementation, CSC module 206 can function to provide a configuration map of the persistent distributed object store 204 and in-memory distributed object store 202 available on each node (e.g., nodes 120) in the cluster, along with the identified data access interfaces for the persistent distributed object store 204 and in-memory distributed object store 202. That is, CSC module 206 can hold a map of a configuration of a system, such as system 100, including compute nodes of a cluster and how the nodes connect to in-memory distributed object store 202, and persistent distributed object store 204, along with the various data access interfaces. CSC module 206 can record persistent distributed object store 204 and in-memory distributed object store 202 that are available on a per node basis along with exposed data access interfaces, storage capacity, and hardware details as part of a configuration file. Metrics, such as telemetry data can be collected by CSC module 206 from the persistent distributed object store 204 and in-memory distributed object store 202, associated with corresponding data access interfaces, and recorded with timestamps.

OPI module 208 functions to generate a wrapper interface through which operations executable by a node (e.g., operation 127A) interface with the in-memory distributed object store 202 and the persistent distributed object store 204. OPI module 208 interacts with the CSC module 206 to obtain a set of data access interfaces available to perform operations, along with the corresponding metrics. The set of available data access interfaces may be provided as an unordered listing of the available data access interfaces. The OPI module 208 can interact with RPA module 212 to obtain a recommendation of one or more best performing data access interface from the set of data access interfaces based on the metrics for each data access interface. In some implementations, OPI module 208 may request a recommendation of the one or more best performing data access for executing a given data workload. In some implementations, OPI module 208 may receive user input requesting execution of a data workload on an optimal data access interface, and OPI module 208 may generate a recommendation request from this input. In an example implementation, the recommendation may be returned as a list of available data access interfaces ordered according to performance of the data access interfaces (e.g., an ordered list) based on the metrics. The data access interfaces may be listed in descending order of performance according to the metrics, where a best performing data access interface is listed first and a lowest performing data access interface is listed last. OPI module 208 can then select the recommended data access interface and execute an operation using the selected data access interface.

A "wrapper" refers to a function that can call one or more other functions, sometimes purely for convenience, and sometimes adapting them to do a slightly different task in a process. In the example implementation of FIG. 2, in which in-memory distributed object store 202 and persistent distributed object store 204 hold object data, the OPI module 208 creates a wrapper interface that functions to encapsulate operations executable by a node, such as data operations and workloads of ML pipelines, so that the operations can access the in-memory distributed object store 202 and/or persistent distributed object store 204 for executing the operations. For example, OPI module 208 can provide a first and second wrapper interface that encapsulate executable operations and maps to the available data access interfaces of the in-memory distributed object store 202 and interface persistent distributed object store 204, respectively. In an illustrative example, each wrapper interface can be provided as a first set of application programming interfaces (APIs) of the operation and a second set of APIs for the exposed data access interfaces.

In an example implementation, OPI module 208 hosts a zero-copy control engine 210 that can cause the wrapper interfaces provided by OPI module 208 to function as zero-copy wrapper interfaces. When used in a distributed environment, OPI module 208 can execute the zero-copy control engine 210 to synchronize data copy from persistent distributed object store 204 to the in-memory distributed object store 202. For example, zero-copy control engine 210 provides a functionality to the wrapper interface that an operation can use to synchronize a plurality of data operations requesting access to data by storing the data to the persistent distributed object store 204 and generating zero-copy data (such as pointers and/or object handles) for storage in-memory distributed object store 202. The zero-copy data directs synchronized data operations requesting access to the data in persistent distributed object store 204. As a result, responsive to one or more data operations requesting access to data, zero-copy control engine 210 can provide zero-copy access to that data, for example, by obtaining zero-copy data from the in-memory distributed object store 202 as pointers to data in persistent distributed object store 204. The data operations can use to obtained zero-copy data to locate the relevant data from the persistent distributed object store 204.

As alluded to above, RPA module 212 can be configured to recommend one or more best performing data access interfaces to the OPI module 208 for executing a data operation. In one example, RPA module 212 may provide a list of available data access interfaces ordered according to performance of each data access interface based on metrics pertinent to requirements of the workload and/or data operation. In another example, RPA module 212 can operate to identify the highest performing data access interface and return this data access interface the OPI module 208. RPA module 212 can execute an algorithm that operates to differentiate performance of the available data access interfaces according to metrics corresponding to the available data access interfaces.

In an example implementation, RPA module 212 receives a data feed from OPI module 208 comprising information on the available data access interfaces and corresponding metrics. The information may include identifiers of the data access interfaces and metric feeds associated (e.g., tagged or otherwise labeled in metadata) with each available data access interface. Each metric feed may represent the metric collected over time and comprise a plurality of metric data points as a function of time. For example, OPI module 208 can function to call the RPA module 212 with a recommendation request message that is packaged with the available data access interfaces as resources to be evaluated and corresponding metric feeds. RPA module 212 can ingest the request message and execute the algorithm on the information contained therein to differentiate the metric feeds relative to a threshold performance to identify highest performing resource (e.g., data access interface). RPA module 212 returns an ordered listing of one or more data access interfaces, which allows the OPI module 208 to use the highest performing resource for the data operation that triggered the request.

The algorithm executed by the RPA module 212, according to an illustrative example, comprises a moving average with crossover and slope detection to determine rank the resource (e.g., data access interface) according to performance based on the metric feeds. Moving averages with crossovers for each metric feed can be used by RPA module 212 to identify higher performing data access interfaces, for example, by calculating moving averages with crossover for each metric feed on an interface-by-interface basis. Additionally, RPA module 212 can dynamically identify one or more stable data access interface for operating through a combination of moving average and linear regression with slope detection. The algorithm executed by RPA module 212 is not limited to the above examples, other approaches to rank resources. For example, an ensemble of mathematical formulas can be used to bring in accuracy and address FALSE positives of an inferences; moving average convergence and divergence can be used without threshold slope detection, which may avoid thrashing across interfaces; among others.

In an example implementation, RPA module 212 calculates a set of moving average points for each metric feed. For example, RPA module 212 can iteratively calculate a moving point from a subset number of metric data points, where the subset shifts over the metric data points according to time. As described above, metric feeds for each data access interfaces may be provided as a function of time, and moving averages can be used to smooth fluctuations in the given feed. In this illustrative example, each subset of the sample data metric point comprises a number ($d_m$) of data metric points. In an example, may $d_m$ is set to 5 data points, but other numbers of data points may be used depending on the desired application. As an illustrative example, a first subset may comprise metric data points $d_0$-$d_4$, a second subset may comprise metric data points $d_1$-$d_5$, a third subset may comprise metric data points $d_2$-$d_6$, and on. While a certain overlap is illustrated here, implementations disclosed herein are not so limited. For example, overlap between subsets may be smaller (e.g., first subset contains metric data points $d_0$-$d_4$, second subset contains metric data points $d_3$-$d_7$, and so on) or there need not be any overlap between subsets (e.g., first subset contains metric data points $d_0$-$d_4$, second subset contains metric data points $d_{10}$-$d_{14}$, and so on). For each metric feed, a number (m) of moving averages can be calculated (e.g., m can be set to 100 as in this example) and provided as a vector of averaged points (e.g., $\{p_1, p_2, \ldots p_{100}\}$). From the averaged points ($p_x$), a trend line $T_x$ can be obtained using a linear regression. This process can be repeated for each available data access interface to obtain a set of trend lines of available data access interfaces $\{T_1, T_2, \ldots, T_n\}$.

Using the set of trend lines, RPA module 212 can rank data access interfaces according to performance from a comparison between trend lines. For example, a current trend line ($T_c$) (e.g., a trend line of an existing or default data access interface that is being used for data operations) can be iteratively compared to remaining other trend lines $\{T_1, T_2, \ldots, T_n\}$, with $T_c$ removed from the set, corresponding to the other available data access interfaces. Comparison can be used to locate crossover points (e.g., points at which the current data access interface trend line intersects trend lines of other data access) between the current trend line ($T_c$) and each of the other trend lines $\{T_1, T_2, \ldots, T_n\}$. For each crossover point located, RPA module 212 can extract a slope m and derive an angle θ. In an example implementation using a linear regression approach, two trend lines can be represented as $y=m_1x+c_1$ and $y_2=m_2x+c_2$, where slopes are represented as $m_1$ and $m_2$ respectively. The angle theta can then be determined by the difference between $m_1$ and $m_2$.

RPA module 212 can then use angle θ to determine whether or not the current trendline $T_c$ corresponds to a data access interface that performs better than the other available data access interfaces. In an example implementation, the current trendline $T_c$ corresponds to a better performing data access interface if the angle θ is equal to or greater than a threshold angle (TH). The threshold angle (TH) may be a tunable threshold, which may be dynamically adjusted during run time. In one example, the threshold angle may be set to 30°; however, other thresholds may be used depending on the desired application.

RPA module 212 can perform the above comparison iteratively over the set of trend lines of available data access interfaces $\{T_1, T_2, \ldots, T_n\}$ to obtain a set of highest performing data access interfaces. For example, a set of better performing data access interfaces can be saved when compared to the existing trend line (e.g., $T_b=\{T_1, T_2, T_3, \ldots, T_n\}$. That is, for example, the current trend line $T_c$ can be compared to every other trend line $\{T_1, T_2, T_3 \ldots T_n\}$, and the best performing data access interfaces can be output as an ordered list $T_b$ (e.g., better trend lines). The set of better performing data access interfaces can be ranked in order of performance, from highest performance to lowest, for example, by performing a maximum sort to filter the data access interfaces according to performance.

RPA module 212 can generate a recommendation response message that is provided to OPI module 208 and includes information identifying the one or more best performing data access interfaces. The information may comprise an identifier of the one or more data access interfaces. In one example, RPA module 212 can select a data access interface corresponding to the highest ranked (e.g., highest performance) and provide an identifier of this data access interface to OPI module 208 packaged in the recommendation response message. In another example, RPA module 212 can provide the order list of data access interfaces to OPI module 208 as a listing of identifiers for the data access interfaces in a list according to performance (e.g., descending order from highest to lowest performing data access interface) packaged in recommendation response message. From the recommendation response message, OPI module 208 can select a highest performing data access interface as an optimal data access interface for the workload or data operation.

Workflow interface optimization architecture 200 can be executed to address potential memory limitations per individual compute nodes (e.g., nodes 120) by configuring storage access and write data operations of workloads (e.g., ML pipeline phases) on each compute node, to a common persistent distributed object store 204. In this case, persistent distributed object store 204 can be used as an overflow space for spillover data that can be utilized by each compute node. For example, each compute node, upon encountering memory constraints when writing data (e.g., data objects and/or key-value data), can execute workflow interface optimization architecture 200 to independently spill over data into the persistent distributed object store 204, such as through execution of zero-copy control engine 210. As another example, when attempting to retrieve data, compute nodes 120 can directly access data from persistent distributed object store 204 as data objects. Integrating persistent distributed object store 204 and in-memory distributed object store 202 with their respective data access interfaces can result in reduced memory consumption (e.g., memory optimization) and CPU usage, thereby conserving computation resources.

With distributed computing techniques, it may be necessary to have a common data store to support data operations in parallel by phases of an ML workflow. However, as described above, such parallel operations can result in duplicative data stored in the common data store, thereby inefficiently consuming memory resources. Implementations disclosed herein address this duplicative data challenge through the zero-copy control engine 210, which functions to provide a zero-copy wrapper interface for data operations, where an input into the zero-copy wrapper interface can be zero-copy data obtained from in-memory distributed object store 202 that references data residing in persistent distributed object store 204. The zero-copy wrapper interface can function to ensure single data operations per node from the distributed persistent storage, insertion of the data to the in-memory object store within a node, and providing zero-copy data, for example, as object handles. This can be used to facilitate zero-copy access to the data by a multiplicity of data operations within a node. The details of its working is described in the zero-copy control engine.

In operation, zero-copy control engine 210 can function to provide a calling layer to the first and/or second wrapper interfaces generated by the OPI module 208. This calling layer can generate zero-copy data for parallel data operations and spillover actual data to persistent distributed object store 204. Zero-copy data (e.g., pointers and/or object handles) can be stored in in-memory distributed object store 202. The calling layer can also operate to recognize request from data operations for the actual data, retrieve corresponding zero-copy data, and provide the zero-copy data that direct data operations to the actual data in persistent distributed object store 204.

Thus, the zero-copy wrapper interface operates to spillover data to the persistent distributed object store 204 that can be accessed across the compute cluster nodes. Through the spillover to persistent distributed object store 204, parallel data operations within a node can be synchronized using the zero-copy data, which can be used to retrieve data from the persistent distributed object store 204, load the data on to the in-memory distributed object store 202, and accessed as zero-copy data from the in-memory distributed object store 202 across the parallel data operations.

Zero-copy control engine 210 can interact with the CSC module 206 to retrieve the configuration information of the persistent distributed object store 204 and creates a pool and containers. The pool and containers can be used for metadata management to ensure a zero-copy based data access from the in-memory distributed object store 202 for data operations on the node. Zero-copy wrapper interfaces provided by zero-copy control engine 210 can be exported through OPI module 208 and added to the first and/or second wrapper interfaces provided by OPI module 208.

In an illustrative example, zero-copy control engine 210 can provide synchronized access to Key-Value Object store held by persistent distributed object store 204. The synchronized access can be used for fetching data and loading it to the in-memory distributed object store 202 of a node by using functionality offered by the zero-copy control engine 210. For example, a plurality of parallel data operations executed as a part of a ML phase (e.g., a training phase 214E) checks whether or not a customer key-value store residing on persistent distributed object store 204 holds data for the data operation, in the case a read data operation (e.g., load data to in-memory distributed object store 202). To execute this check, each data operation checks a length of the custom Key-Value store (e.g., "zeroCopyLockKV").

If the length is zero (e.g., "zeroCopyLockKV length==0"), which is indicative that no other data operation has written this data to Key-Value store, then a Key-Value store name is prepared by the data operation that returned a zero. In an illustrative example, the Key-Value store name is prepared based on an identifier of the node (e.g., nodename) and the ML phase and data operation that the request pertains to. For example, if custom Key-Value store has a length of 0, then a data operation (e.g., first data operation in this example) sets a Key to the node identifier and a Value to the node identifier and ML phase and data operation to be performed. In an illustrative example, for a node having nodename1, the Key may be set to "nodename1" and Value set to "nodename1: Training Phase: Load to in-memory object store." The first data operation then instantiate the persistent distributed object store 204 pool and container using with the Key-Value store name. Next, the data operation loads values from the Key-Value store (e.g. Persistent distributed object store 204), using the passed (e.g., made available to a process through the Key-Value store) keys of the Key-Value, into the in-memory distributed object store 202 of the node. An object-id is returned to the data operation based on loading the Key-Values to the in-memory distributed object store 202, and the object-ids are saved into another a Key-Value store of the persistent distributed object store 204. The other Key-Value store may be named so to indicate that the Key-Value store corresponds to in-memory objects for a node (e.g., "inMemoryObjIDNode").

If the length is not equal to zero (e.g., "zeroCopyLockKV length!=0"), which is indicative that another data operation (e.g., the first data operation) has written this data to Key-Value store, the data operation iterates (e.g., loops through the data to check the metadata information regarding the node, such as "nodename1") and checks if previous data corresponds to the same node and same phase, for example, by referencing the key and value set according to the above. If the written data does correspond to the same node and same phase, the data operation then sleeps for a defined amount of time and, after the time has elapsed, re-checks if the data load is complete within the custom Key-Value store (e.g., zeroCopyLockKV). Parallel distributed processes can run on multiplicity of compute nodes as part of the ML training process, and this step provides for this. For example, this step ensures that data requests comes from multiple compute nodes at the same time, compute node details from which each request is received can be recorded and then continue if the request came from another node since it is the first time for that node. The defined amount of time may be set as desired for a given application. If false (e.g. not the same node or not the same phase), then the data operation may proceed to prepare a key and value, instantiate the persistent distributed object store 204 pool and containers, and load values to the in-memory distributed object store 202 as described above.

In either case, each of the parallel data operations can access the other Key-Value store (e.g., inMemoryObjID-Node) and execute an in-memory object store 202 fetch on these object-ids. As a result, each of the parallel data operations on the node will receive a zero-copy mapping of the ids to the data in in-memory distributed object store 202. For example, since the data is already written to in-memory object store 202, waiting processes require an object handle, in this case object-ids, which points to the same memory location in the in-memory distributed object store 202, thereby not copying the data again into a different location of the in-memory distributed object store 202. Accordingly, zero-copy control engine 210 can function to alleviate the problem of data duplication, as well as ensure zero-copy access for parallel data operations on a ML pipeline. We obtained performance benefits and results are here.

In the illustrative example of FIG. 2, phases 214a-214f (collectively referred to herein as phases 214) of an ML pipeline are provided as examples of an workloads that may issue data operations 127A that can be executed by a node, as described above in connection with FIG. 1. In executing each of phases 214, a node may execute workloads that issue data operations (e.g., read/write operations) requiring access to data stored in either in-memory distributed object store 202 or persistent distributed object store 204. As described above, workflow data access interface optimization architecture 200 can be executed to select an optimal data access interfaces for accessing in-memory distributed object store 202 or persistent distributed object store 204 in performing data operation of a phase 214.

FIG. 3 is a flow diagram of an example process 300 for optimizing data access interface usage in accordance with implementations disclosed herein. Process 300 may be implemented as instructions, for example, stored in a memory, that when executed by one or more processors perform one or more operations of process 300. The process 300 will be described below with reference to FIGS. 1 and 2 as an illustrative example. For example, process 300 may be performed by a node 120 executing the workflow interface optimization architecture 200. However, one skilled in the art will appreciate that the embodiments disclosed herein are not to be limited to this implementation only. For example, process 300 may be implemented as instructions stored in a cloud-based architecture referenced by a node 120.

In an illustrative example, consider a training phase of a ML pipeline, in which training is distributed across the cluster of nodes 120 (e.g., phase 214E of FIG. 2 distributed across nodes 120). In this scenario, one or more nodes 120 of the cluster can execute workflow interface optimization architecture 200 to access in-memory distributed object store 202 and/or persistent distributed object store 204 for data operations executed as part of the training phase. In selecting which data store and/or which data access interface to utilize for the data operations, workflow interface optimization architecture 200 may perform process 300 to select an optimal data access interface for according to the workload and performance of the data access interfaces.

At initialization, process 300 performs block 302 in which the CSC module 206 on a compute node identifies data access interfaces exposed by in-memory distributed object store 202 and persistent distributed object store 204 on the respective compute node. As described above, CSC module 206 can function to provide a configuration map of the in-memory distributed object store 202 and persistent distributed object store 204 available to each node 120 in the cluster. In an illustrative example, CSC module 206 can discover the in-memory distributed object store 202 and persistent distributed object store 204 available on a per node basis along with data access interfaces, capacity, and hardware details, which can be recorded in a configuration file held at the CSC module 206. CSC module 206 can also discover metrics for in-memory distributed object store 202 and persistent distributed object store 204 for each available data access interface. The metrics can be recorded as metric feeds associated with respective data access interfaces, with each data point tagged with a timestamp and identifier of the associated data access interface.

At block 304, the OPI module 208 can be executed to map the data access interfaces discovered at block 302 to a first wrapper interface corresponding to the in-memory distributed object store 202 and a second wrapper interface corresponding to the persistent distributed object store 204. As described above, OPI module 208 interact with CSC module 206 to obtain node-specific details, such as configured persistent distributed storage, in-memory object store, their capacity, and data access interfaces available to that node. In an example implementation, OPI module 208 obtains a set of available data access interfaces (e.g., exposed data access interfaces) of the in-memory distributed object store 202 for a node and maps APIs of the exposed data access interfaces to a first wrapper API of the OPI module 208. OPI module 208 also obtains a set of available data access interfaces of the persistent distributed object store 204 for the node and maps APIs of the exposed data access interfaces to a second wrapper API of the OPI module 208.

At block 306, a ML pipeline (e.g., operation 127A for example) uses one of the first and second wrapper interfaces depending on the phase of the ML pipeline and workload requirements. For example, based on the data operation performed by a node 120 (e.g., read or write), block 306 functions to select one of the first wrapper for in-memory distributed object store 202 or the second wrapper for persistent distributed object store 204 through which data operations for the phase will be executed. For example, in the case where a phase includes a data read operation, block 306 may select to use the first wrapper interface for in-memory distributed object store 202. Whereas, in the case where a phase includes a data write operation, block 306 may select to use the second wrapper interface for persistent distributed object store 204. Example ML pipeline and workload requirements can include, but are not limited to, small datasets store only in-memory object store 202, large dataset stored in-memory object store 202 and persistent distributed object store 204, cases where persistent distributed object store 204 and direct in-memory distributed object store 202 usage is sufficient. The requirements may vary dependent on the data type and the ML pipeline phase executed.

As an illustrative example, ML pipeline elements 214A-214F may have different needs. For example, data-preprocessing phase 214B can perform pre-processing of the data and makes the data ready for consumption by model-training phase 214D. In this case, if the data is small then the data could be hosted in in-memory distributed object store 202 and retrieved by the model-training phase 214D. If data is large and the ML pipeline being executed in a distributed environment, then pre-processing phase 214B may output GET commands to persistent distributed object store 204, on the distributed compute nodes where model-training phase 214D is being ran. Block 306 evaluates the requirements of the phases so to determine to use both persistent distributed object store 204 and in-memory distributed object store 202 via zero-copy functionality disclosed herein.

At block 308, the selected wrapper interface from block 306 can be invoked by the ML pipeline process (e.g., optimized-distributed-interface, optimized-in memory-interface, etc.).

At block 310, OPI module 208 interacts with CSC module 206 to obtain a set of available data access interfaces for the invoked wrapper interface from block 308, along with metric feeds corresponding to the available data access interfaces. In an example implementation, OPI module 208 obtains this information upon sufficient quantity of metrics captured and available on CSC module 206. For example, user threshold of data points may be set as a number of data points required to propagate values to RPA module 212, initially or after a switch in a current data access interface. If this threshold value is not met, default data access interfaces can be selected until the number data points is built up to at least equal to the threshold. The threshold in some examples may be set to 50, but other thresholds are applicable as desired for a given application. The threshold may be set so to ensure the algorithm does not keep selecting newer, but potentially less optimal, data access interfaces, at least until stability is achieved and an optimal data access interface can be determined. The threshold hold may be set by a user.

In an example implementation, for each available data access interface in the set, OPI module 208 can record metrics by considering the kind of data (e.g., the size of the data, the type of data operation type such as read or write, and so on) that will be required for the data operation. If there are no metrics available, the OPI module 208 can use a default data access interface to retrieve metrics, such as size, operation, latency, the data access interface used, and so on. OPI module 208 can use any method for obtaining the data metrics of the data access interfaces from CSC module 206. For example, telemetric data can be obtained from an interface layer of in-memory object store 202 and/or persistent distributed object store 204. As another example, the OPI module 208 can record data size and data access interface used, and then calculate time taken for the operation and add this as a metric. In another example, OPI module 208 may use heuristic sampling of data recorded at CSC module 206. In this case, telemetry data exported by the in-memory distributed object store 202 and persistent distributed object store 204, stored at CSC module 206, can be obtained by OPI module 208 sampling the metric over time. Through the telemetry data, metric of the data access interfaces (e.g., granular characteristics like data sizes, and access time or latency) can be isolated and recorded at OPI module 208 as metric feeds. The metrics for the data access interfaces can be linked and stored in CSC module 206 as described above. In another example, OPI module 208 can use iterative data access interface evaluation to obtain metric feeds. In this case, OPI module 208 iterates through the various data access interfaces exposed in-memory distributed object store 202 and persistent distributed object store 204, based on the process to be executed, and records the metric mappings (e.g., data access interface and performance metrics obtained for the data access interface) for each of them through CSC module 206.

At block 312, OPI module 208 calls the RPA module 212 with the metrics feeds for each exposed data access interface for the invoked wrapper interface. For example, OPI module 208 can query RPA module 212 by generating a recommendation request message requesting identification of best performing data access interfaces and issuing the request to the RPA module 212. The recommendation request message can be packaged with identifiers of the available data access interface for evaluation and corresponding metric feeds.

At block 314, RPA module 212 analyzes the metric feeds and returns a listing of the one or more best performing data access interfaces to the OPI module 208. For example, RPA module 212 may generate a recommendation response message comprising identifiers of the one or more best performing data access interfaces and issue the response to the OPI module 208. The recommendation response message can comprise a listing of identifiers of the one or more best performing data access interfaces as determined by the RPA module 212. In one example, the listing is a ranking in a descending order of best performing (e.g., highest performing) data access interface to worst (or lowest) performing data access interface. In another example, RPA module 212 may return only the highest performing data access interface. As yet another example, the listing may comprise a percentage or number of the highest performing data access interfaces, such as the top 10%, 25%, etc. As described above in connection with FIG. 2, RPA module 212 executes an algorithm on the metrics feeds provided by OPI module 208 to differentiate metrics, rank performance, and generate the ordered list of the one or more best performing data access interfaces.

At block 316, OPI module 208 functions to select an optimal data access interface from the set returned by RPA module 212, and execute the data operation using the selected data access interface. For example, OPI module 208 may select the highest ranked data access interface (e.g., first data access interface on the list) and execute the operation on this data access interface. In another example, OPI module 208 may select another, lower ranked data access interface from the returned set, for example, based on determining that the highest performing data access interface is busy, deactivated, etc. In the case of a RPA module 212 returns only the highest performing data access interface, OPI module 208 can use this data access interface.

At block 318, OPI module 208 can monitor the execution of the data operation and record performance metrics of the data access interfaces in performing the data operation to CSC module 206. The recorded performance metrics can be tagged with an identifier of the data access interface and a timestamp. Accordingly, OPI module 208 can update CSC module 206 for optimal use in the selected data access interfaces during subsequent data access. If there were any errors when using the selected data access interfaces, the OPI module 208 can function to revert to using another data access interface, such as an data access interface that was used for a previous operation and/or a next highest ranked data access interface from the list received at block 316.

As described above, in-memory distributed object store 202 and persistent distributed object store 204 have a multiplicity of data access interfaces that can be used effectively in different scenarios. The ability to use an optimally selected data access interface through process 300 results in lower latency data operations along with optimized usage of memory.

Figure 4:
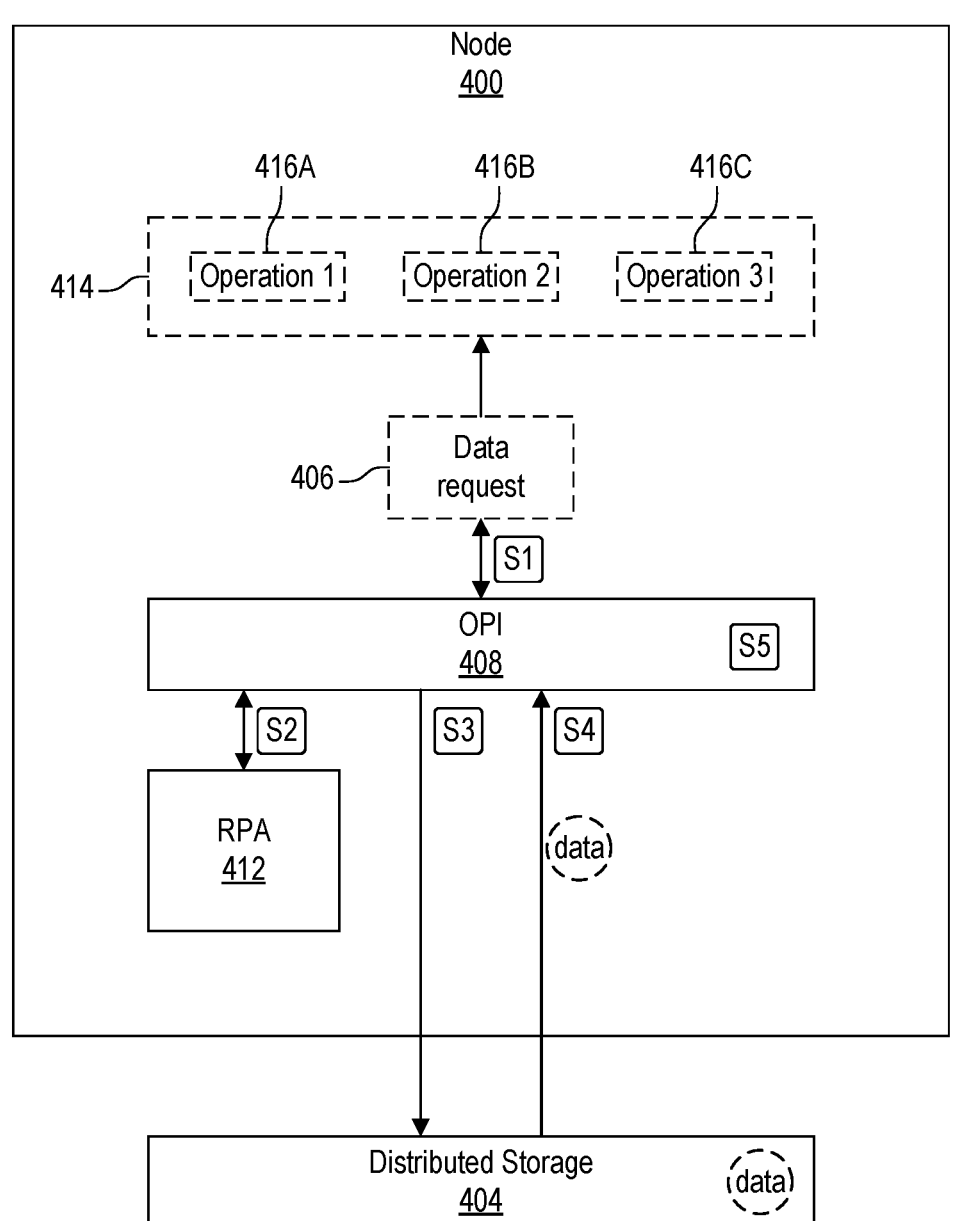
FIG. 4 is a process flow for selecting an optimal data access interface of a persistent distributed storage for executing a data operation in accordance with an example implementation.

FIG. 4 is a process flow for selecting an optimal data access interface of a persistent distributed storage for executing a data operation in accordance with an example implementation. FIG. 4 illustrates the process flow executed by a node 400, which may be an example of a node 120 of FIG. 1. Node 400 may execute a phase 414 of an ML Pipeline, which includes one or more data operations, illustratively shown as a plurality of data operations 416a-416c (collectively referred to herein as operations 416 or singularly as data operations 416). At least one of data operations 416 includes a data read operation 406 to request/fetch data from a persistent distributed storage 404. Persistent distributed storage 404 may be an example implementation of persistent distributed object store 204 and/or persistent distributed storage node 110A.

Node 400 may perform operations of process 300 in executing the data operation 416. For example, at S1, a data operation 416 requests data through OPI module 408, which may be substantially similar to OPI module 208. Prior to S1, OPI module 408 may have mapped data access interfaces to first and second wrapper interfaces (e.g., block 304 of FIG. 3). Thus, when OPI module 408 receives the data read operation 406, a wrapper interface for persistent distributed storage 404 can be invoked based on the phase of the ML pipeline and workload requirements, as described above at blocks 306 and 308 of FIG. 3.

At S2, OPI module 408 calls RPA module 412 to request a recommendation of the best performing data access interfaces of the invoked wrapper interface. The RPA module 412 may be substantially the similar to RPA module 212 of FIG. 2. As described above, RPA module 412 generates a listing of one or more of the best performing data access interfaces based on metric feeds provided by OPI module 408, and returns the listing to OPI module 408 at S2. In this example, the data request may contain a request to fetch an entire key-value (object) store from persistent distributed storage 404. Thus, RPA module 412 may recommend using a bulk data access interface over a granular data access interface.

At S3, OPI module 408 selects the best performing data access interface from the listing provided by the RPA module 412 and uses the selected data access interface at S3 to request data from the persistent distributed storage 404. At S4, data from the selected data access interface is received from persistent distributed storage 404. For example, data can be received to a memory (e.g., an in-memory store) in the node 400.

The OPI module 408 can recognizes that the data operation 416 is not followed by other connecting in-memory object store data access interface requests for the same data, at S5. For example, OPI module 408 recognizing that it has not received any additional requests from phase 414 for the same data. For example, if the data requested in a bulk mode already has the data required by, for example, data operation 416C, then expensing another operation is not required. This may be an example of a kind of a synchronization mechanism.

Figure 5:
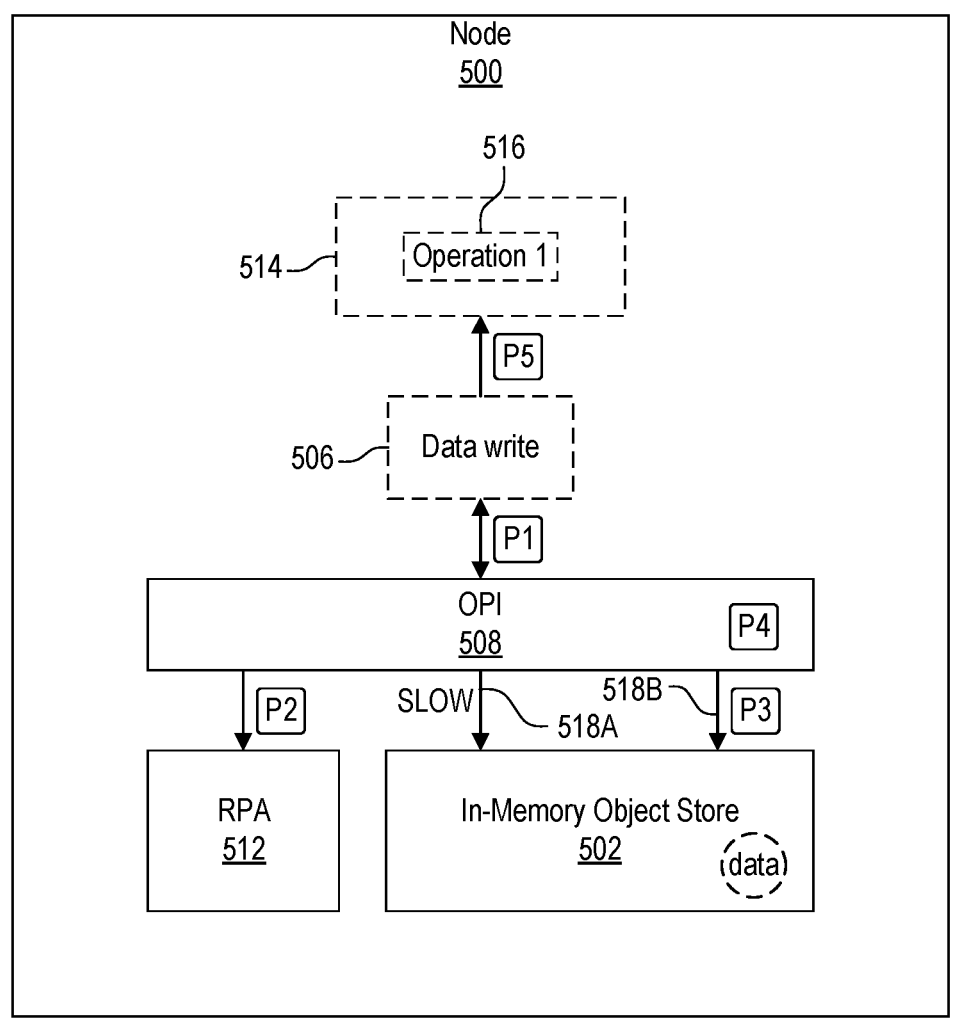
FIG. 5 is a process flow for selecting an optimal data access interface of an in-memory object store for executing a data operation in accordance with an example implementation.

FIG. 5 is a process flow for selecting an optimal data access interface of an in-memory object store for executing a data operation in accordance with an example implementation. FIG. 5 illustrates the process flow executed by a node 500, which may be an example of a node 120 of FIG. 1. Node 500 may execute a phase 514 of an ML pipeline. Phase 514 includes one or more data operations 516, one of which issues a data write operation 506 to write data into the in-memory object store 502. In-memory object store 502 may be an example implementation of in-memory distributed object store 202 and/or in-memory store 125A.

As shown in FIG. 5, data operation 516 makes a write call to the in-memory object store 502 by sending data write operation 506 to OPI module 508, at P1. OPI module 508 may be substantially similar to OPI module 208 of FIG. 2. Node 500 may perform process 300 in executing phase 514. For example, prior to P1, OPI module 508 may have mapped data access interfaces to first and second wrapper interfaces (e.g., block 304 of FIG. 3). Thus, when OPI module 508 receives the data write operation 506, a wrapper interface for in-memory object store 502 can be invoked based on the phase and workload requirements, as described above at blocks 306 and 308 of FIG. 3.

At P2, OPI module 508 calls RPA module 512 to request a recommendation of the best performing data access interfaces of the invoked wrapper interface. The RPA module 512 may be substantially the similar to RPA module 212 of FIG. 2. The recommendation request comprises the available data access interfaces of the in-memory object store 502 for the node 500 and the operation 516, along with corresponding metric feeds. In the example of FIG. 5, in-memory object store 502 is shown with two available data access interfaces 518A and 518B, but this is merely for illustrative purposes and any number of data access interfaces may be available. The RPA module 512 may be substantially the similar to RPA module 212 of FIG. 2. As described above, RPA module 512 calculate a listing of one or more of the best performing data access interfaces for data write operation 506 based on the metric feeds, as provided by OPI module 508, and returns the listing to OPI module 508 at S2. In this example, data access interfaces 518A may be a client buffer interface and data access interfaces 518B may be a get/put interface. Based on the data write operation 506 and metric feeds, the RPA module 512 may recommend using the get/put data access interface 518B over client buffer data access interface 518A, because, for data write operation 506, data access interfaces 518A may be slow and not optimal for data write operation 506 according to comparison of the metrics feeds.

At P3, OPI module 508 writes the data (e.g., data object and/or key-value data) into the in-memory object store 502 using the data access interface 518A recommended by RPA module 512. At P4, OPI module 508 records performance metrics for executing the data write operation 506 using the selected data access interface, such as latency (e.g., time to write the data to in-memory object store 502), transfer rate, among any other metrics related to performance of the data write operation 506. OPI module 508 then provides phase 514 with resultant data (e.g., objects) to complete the data write operation 506.

FIGS. 6-9 provide graphical representations of results for the workflow interface optimization according to an example implementation. In the implementation used to generate FIGS. 5-8, an ML pipeline of data ingestion, data pre-processing, ML model training-HPO (Hyper parameter optimization) as simulated. The ML model was a Convolutional Neural Network (CNN) Model for chest x-ray diseases classification. The ML pipeline was running a distributed training environment. System configuration was as follows: a persistent distributed object store was provided as a DAOS configuration. Apache Plasma was used as in-memory distributed object stores. Each object of size 100 MB, with 20 Objects written (PUT) from data pre-processing provided by Apache Plasma and pyDAOS interfaces. In this exploration, three training process per node (e.g., 6 total) read 20 objects each (e.g., 120 total). Data pre-processing was performed by node data operations in chunks of 100 MB objects of the. Twenty objects were written through Plasma (to memory or local SSD)/pyDAOS to DAOS store.

Figure 6:
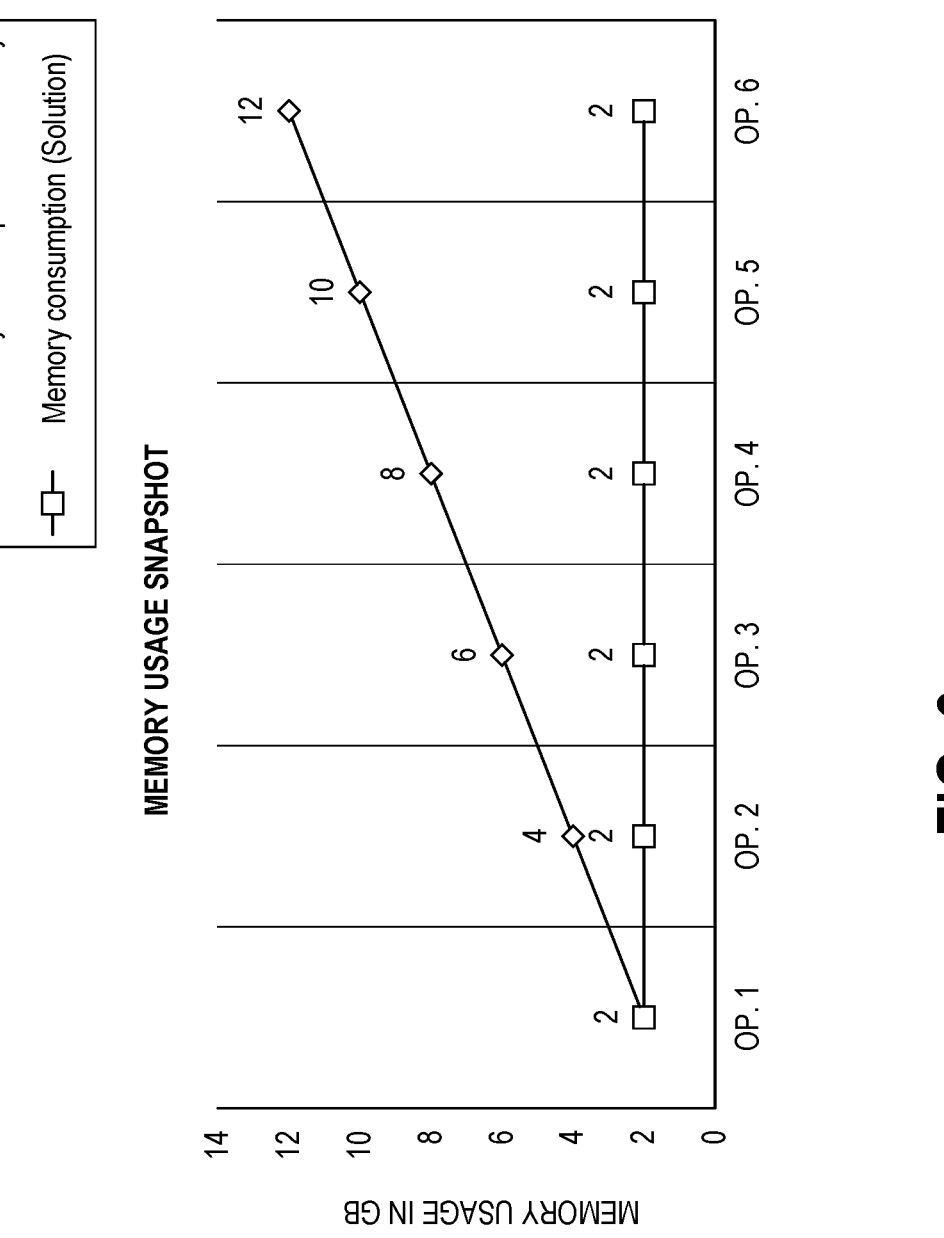

FIG. 6 illustrates memory usage optimization with zero-copy access provided by a zero-copy control engine in accordance with implementations disclosed herein. FIG. 6 outlines the usage of the simulated implementation with in-memory object store data shared across 6 different data operations. The ML pipeline with CNN model training and HPO for learning rate with accuracy early stop criteria. This was initiated on a single node with 6 parallel data operations scheduled to distribute the computation. Each of these data operations required the transformed data output from the data pre-processing module. When the data operations are run individually, the total memory consumed for hosting this data was 12 GB. This is a result of a single data set of 2 GB size being duplicated across 6 data operations in memory. However, when the zero-copy control engine according to the present disclosure is utilized, the data can be hosted in an in-memory object store (e.g., Apache Plasma in this case) and referenced using the same object handles by the 6 parallel data operations. This implementation leads to shared memory based zero-copy access, which reduces memory resource consumption significantly shown in FIG. 6. Accordingly, without the zero-copy control engine, the memory consumption was 12 GB. Whereas, with the zero-copy control engine, the memory usage reduced to about 6× less, that is, approximately 2 GB.

FIG. 7 is a graphical representation of performance on two sets of interfaces of an in-memory object store according to the example implementation. In the simulation used to generate FIG. 7, the in-memory object store implemented as Apache Plasma supports 2 sets of interfaces: a Client get and a Client put interface and a Buffer get and a Buffer put interface. The Buffer get/put is more granular for providing control to create a buffer, obtain object id, and sealing. As shown in FIG. 7, performance of the Client get interface is 9× faster than the Buffer get, while the performance of the Buffer put interface is slightly better than the Client put (e.g., less time taken). Thus, in the ML pipeline, when data needs to be read several times, implementations disclosed herein can recommend the Client get interface as the best performing interface, which can be used to improves the performance of the ML pipeline (e.g., less time to perform a get operation).

Figure 9:
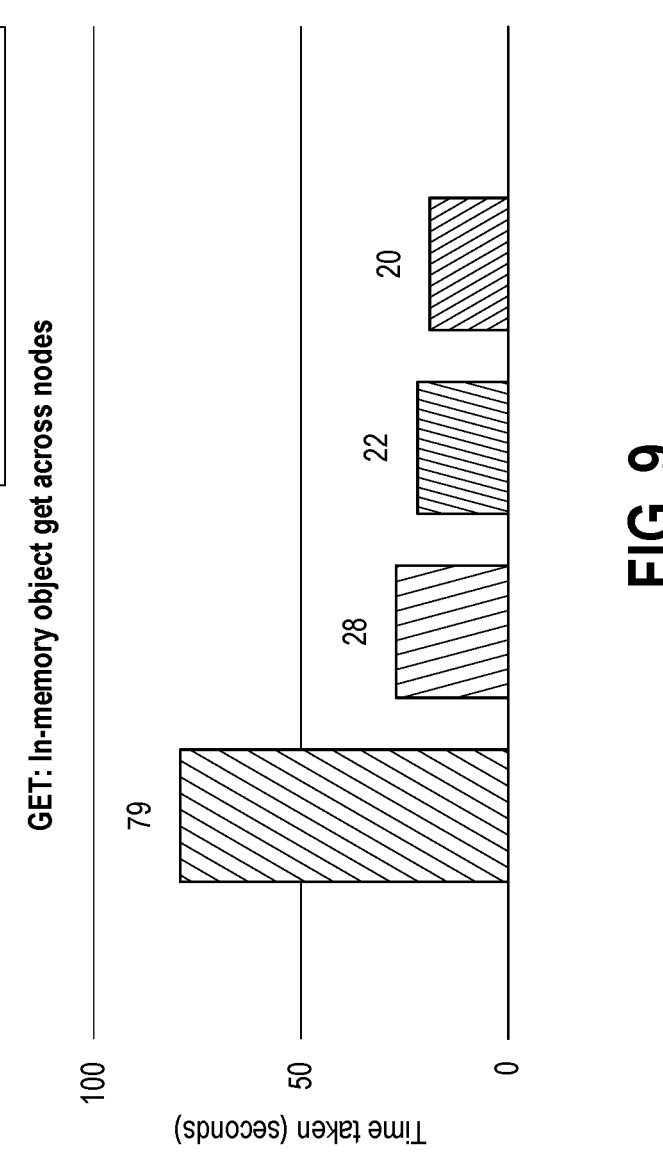

FIG. 8 is a graphical representation of performance on two sets of interfaces of an persistent distributed object store according to the example implementation. In this case, persistent distributed object store implemented as DAOS (pyDAOS library) supports two set of interfaces: a Bulk get and Bulk put and an atomic get and an atomic put, which is a granular interface per key basis on the Key-Value store. As shown in FIG. 9, the Bulk get interface for 120 objects performs 2× times better than 120 separate get calls on the atomic get interface and the Bulk get on a pool made of SCM (Storage Class Memory) plus SSD performs approximately 30% better than SCM pool (e.g., atomic get interface) . . . . The pool in this case constituted both persistent memory and SSD disk storage space, which were collected across two DAOS storage server nodes. Thus, in an ML pipeline, when there is a set of data that needs to be read from a specific persistent distributed object store, using the bulk get interface may be better in performing and can be used to improve performance by reducing execution time.

FIG. 9 is a graphical representation of performance in fetching data from an in-memory distributed object store hosted on a local node and a foreign node. In this example, when fetching data remotely (e.g., foreign data), an Ethernet network was used to transfer the data between nodes. FIG. 9 elucidates time taken to fetch 60 objects having a total of size 6 GB from each node. The in-memory distributed object store get (e.g., fetch) interface from the local in-memory store of the node is relatively efficient; however, the remote get interface shows the network is not optimized for foreign data transfers and results in a bottleneck. The persistent distributed object store (e.g., DAOS (pyDAOS)) get (fetch/read) interface is almost consistent across nodes, since this is a distributed object store. Accordingly, the persistent distributed storage based fetch is approximately 2× faster than using the in-memory object store based fetch for data residing within the memory.

FIG. 10 illustrates an example computing component that may be used to implement data access interface usage optimization in accordance with various embodiments. Referring now to FIG. 10, computing component 1000 may be, for example, a server computer, a controller, or any other similar computing component capable of processing data. In the example implementation of FIG. 10, the computing component 1000 includes a hardware processor 1002, and machine-readable storage medium for 1004.

Hardware processor 1002 may be one or more central processing units (CPUs), semiconductor-based microprocessors, and/or other hardware devices suitable for retrieval and execution of instructions stored in machine-readable storage medium 1004. Hardware processor 1002 may fetch, decode, and execute instructions, such as instructions 1006-1012, to control processes or operations for optimizing data access interface usage. As an alternative or in addition to retrieving and executing instructions, hardware processor 1002 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1004, may be any electronic, magnetic, optical, or other physical storage device that contains or stores executable instructions. Thus, machine-readable storage medium 1004 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1004 may be a non-transitory storage medium, where the term "non-transitory" does not encompass transitory propagating signals. As described in detail below, machine-readable storage medium 1004 may be encoded with executable instructions, for example, instructions 1006-1012.

Hardware processor 1002 may execute instruction 1006 to identify a first one or more data access interfaces for a persistent storage distributed across a plurality of storage nodes and a second one or more data access interfaces for an in-memory object store. The persistent storage may be implemented as distributed persistent storage 116 and/or persistent distributed object store 204, and the in-memory object store may be implemented as in-memory store 125A and/or in-memory distributed object store 202. The first one or more data access interfaces may be implemented, for example, as data access interfaces 118A-118N, and the second one or more data access interfaces may be implemented as, for example, data access interfaces 128A-128N. In an example implementation, CSC module 206 may discover available data access interfaces for each of in-memory distributed object store and persistent storage and create mapping of the configuration of the in-memory distributed object store and persistent storage, along with interfaces, to a cluster of compute nodes (e.g., node 120).

Hardware processor 1002 may execute instruction 1008 to receive, from a compute node, a data operation request as part of a machine learning pipeline. For example, while executing a phase, a compute node may issue one or more data operations as data write operations, data read operations, and a combination thereof.

Hardware processor 1002 may execute instruction 1010 to obtain performance metrics for the first one or more data access interfaces and the second one or more data access interfaces. For example, CSC module 206 may also discover performance metrics exposed by the in-memory distributed object store and persistent storage for each available data access interface. OPI module 208 can then issue a recommendation request to, for example, RPA module 212, which returns a recommendation response with one or more data access interfaces, as described above.

Hardware processor 1002 may execute instruction 1012 to, based on a type of data operation request, execute the data operation using a data access interface selected from the first one or more data access interfaces based on the performance metrics and providing an object handle to the compute node. For example, as noted above, RPA module 212 returns a recommendation response with one or more data access interfaces, from which RPA module 212 can select an optimal data access interface for executing the data operation. The data operation may be a data read operation and/or a data write operation depending on the workload and phase of the ML pipeline. As described above, in connection with FIG. 2, object handles can be provided, in the form of zero-copy data, for directing a compute node to zero-copy access to data.

Figure 11:
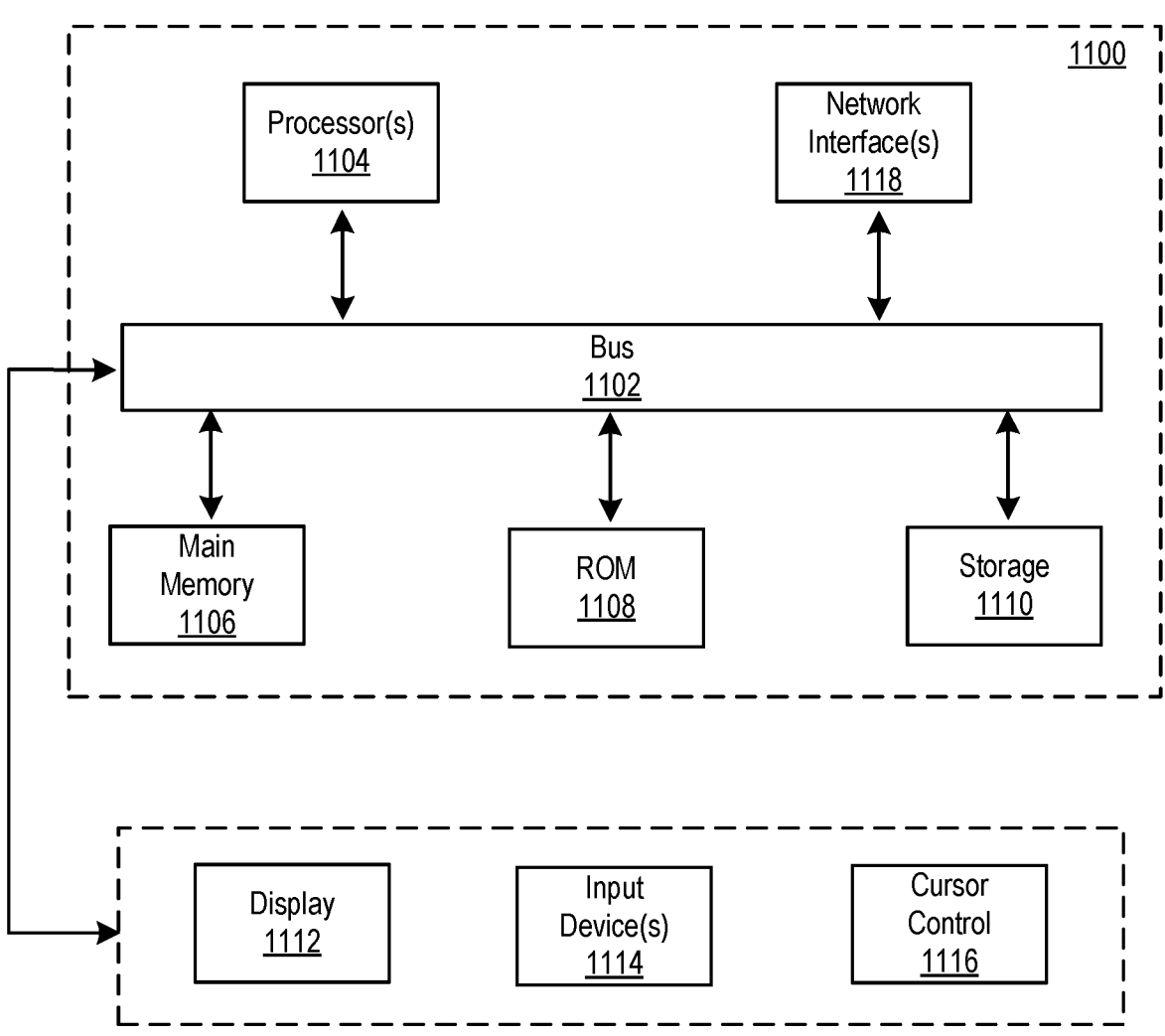
FIG. 11 is an example computer system that may be used to implement various features of optimizing data access interface usage of the present disclosure.

FIG. 11 depicts a block diagram of an example computer system 1100 in which various of the embodiments described herein may be implemented. The computer system 1100 may be an example implementation of persistent distributed storage node 110A and/or node 120, The computer system 1100 includes a bus 1102 or other communication mechanism for communicating information, one or more hardware processors 1104 coupled with bus 1102 for processing information. Hardware processor(s) 1104 may be, for example, one or more general purpose microprocessors. Processor 1104 may be an example implementation of processor(s) 112 and/or processor(s) 122A.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a liquid crystal display (LCD) (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

The computer system 1100 also includes a communication interface 1118 coupled to bus 1102. Network interface 1118 provides a two-way data communication coupling to one or more network links that are connected to one or more local networks. For example, communication interface 1118 may be an integrated services digital network (ISDN) card, cable modem, satellite modem, or a modem to provide a data communication connection to a corresponding type of telephone line. As another example, network interface 1118 may be a local area network (LAN) card to provide a data communication connection to a compatible LAN (or WAN component to communicated with a WAN). Wireless links may also be implemented. In any such implementation, network interface 1118 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1118, which carry the digital data to and from computer system 1100, are example forms of transmission media.

The computer system 1100 can send messages and receive data, including program code, through the network(s), network link and communication interface 1118. In the Internet example, a server might transmit a requested code for an application program through the Internet, the ISP, the local network and the communication interface 1118.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1100.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for optimized data access interface usage in machine learning pipelines, the method comprising:

identifying, by a compute node, a plurality of data access interfaces comprising at least a first data access interface for a persistent storage distributed across a plurality of storage nodes and at least a second data access interface for an in-memory object store;

receiving, by the compute node from a process executed on the compute node, a data operation request as part of a machine learning pipeline;

obtaining, by the compute node, performance metrics for the plurality of data access interfaces; and executing, by the compute node, the data operation request on the persistent storage using a best performing data access interface selected from the at least a second data access interface based on the performance metrics and a type of the data operation request, wherein executing the data operation request comprises writing data to the persistent storage, and writing, to the in-memory object store, object handles pointing to the data written to the persistent storage, wherein executing a subsequent data operation comprises accessing the object handles in the in-memory object store that direct the data operation to the data stored to the persistent storage.

2. The method of claim 1, wherein the data operation request is a first instance of a data write request.

3. The method of claim 2, further comprising:

for a second or later instance of the data operation, executing the second or later instance by accessing the object handles written to the in-memory storage using a best performing data access interface selected from the at least a first data access interface based on the performance metric.

4. The method of claim 1, wherein selecting from the at least a second data access interfaces based on the performance metrics comprises determining a moving average with crossover and slope detection from performance metrics of each data access interface.

5. The method of claim 1, further comprising:

generating a list of data access interfaces from the plurality of data access interfaces based on the performance metrics, wherein the list of data access interfaces are listed in descending order of performance according to the performance metrics, wherein the data access interface for executing the machine learning pipeline is selected from the generated list of data access interfaces based, in part, on the descending order.

6. The method of claim 1, further comprising:

mapping the identified at least a first access interface to a first wrapper interface; and mapping the identified at least a second data access interface to a second wrapper interface.

7. The method of claim 6, further comprising:

based on a phase of the machine learning pipeline and workload requirements of the phase, invoking one of the first wrapper interface and the second wrapper interface, wherein the phase comprises the data operation.

8. The method of claim 1, wherein plurality of data access interfaces comprises application programming interfaces (APIs).

9. A system, comprising:

an in-memory object store configured to store data objects and object handles;

a persistent distributed storage configured to store data objects; and one or more processors communicatively coupled to the in-memory object store via a first one or more data access interfaces and communicatively coupled to the persistent distributed storage via a second one or more data access interfaces, the one or more processors configured to execute instructions stored in a memory to:

identify a plurality of data access interfaces comprising at least a first data access interface for the persistent distributed storage and at least a second data access interface for the in-memory object store;

issue a data operation request as part of a machine learning pipeline;

obtain performance metrics for the plurality of data access interfaces;

for a first instance of the data operation request, executing the data operation on the persistent storage using a best performing data access interface selected from the at least a second data access interfaces based on the performance metrics and a type of the data operation request, wherein executing the data operation request comprises writing data to the persistent storage, and storing, to the in-memory object store, an object handle pointing to the data written to the persistent storage; and for a second or later instance of the data operation, executing the data operation by accessing the object handle in the in-memory object store that directs the data operation to the data stored to the persistent storage.

10. The system of claim 9, wherein the data is written to the persistent storage using the best performing data access interface selected from the at least a second data access interface.

11. The system of claim 9, wherein selecting from the at least a second data access interfaces based on the performance metrics comprises determining a moving average with crossover and slope detection from performance metrics of each data access interface.

12. The system of claim 9, wherein the one or more processors are further configured to execute the instructions to:

generate a list of data access interfaces from the plurality of data access interfaces based on the performance metrics, wherein the list of data access interfaces are listed in descending order of performance according to the performance metrics, wherein the data access interface for executing the machine learning pipeline is selected from the generated list of data access interfaces based, in part, on the descending order.

13. The system of claim 9, wherein the one or more processors are further configured to execute the instructions to:

map the identified at least a first access interface to a first wrapper interface; and map the identified at least a second data access interface to a second wrapper interface.

14. The system of claim 13, wherein the one or more processors are further configured to execute the instructions to:

based on a phase of the machine learning pipeline and workload requirements of the phase, invoke one of the first wrapper interface and the second wrapper interface, wherein the phase comprises the data operation.

15. A compute node, comprising:

a processor; and a memory communicatively coupled to the processor and configured to store:

a common store configuration (CSC) module executable, by the processor, to discover identify plurality of data access interfaces exposed by a first data store and a second data store and collect metrics corresponding to each of the plurality of data access interfaces;

an optimized performance interface (OPI) module executable, by the processor, to:

obtain, from the CSC module, the plurality of data access interfaces and map the plurality of data access interfaces to a plurality of wrapper interfaces, wherein a first wrapper interface corresponds to the first data store and the second interface corresponds to the second data store, and responsive to a data operation received by the OPI module, generate a recommendation request message requesting identification of a best performing data access interface from the plurality of data access interfaces;

a resource performance analyzer (RPA) module executable, by the processor, to receive the recommendation request and return one or more of the best performing data access interfaces to the OPI module, wherein the OPI module performs the data operation using one of the one or more best performing data access; and zero-copy control engine executable, by the processor, to synchronize a plurality of parallel data operations by loading data into the first data store, and generating and storing object handles in the second data store directing the plurality of parallel data operations to the data loaded into the first data store.

16. The compute node of claim 15, wherein the recommendation request comprises identifiers of the plurality of data access interfaces obtained from the CSC module and a plurality of metric feeds corresponding to the plurality of data access interfaces.

17. The compute node of claim 16, wherein RPA module is executable, by the processor, to identify the one or more of the best performing data access interfaces based on moving average with crossover and slope detection of the metrics corresponding to each data access interface.

18. The compute node of claim 15, wherein the RPA module is further executable, by the processor, to generate a list of data access interfaces from the plurality of data access interfaces based on the metrics, wherein the list of data access interfaces are listed in descending order of performance according to the metrics.

19. The compute node of claim 15, wherein the OPI module is executable, by the processor, to invoke one of the plurality of wrapper interfaces based on the data operation and workload requirements of the data operation.

20. The compute node of claim 15, wherein first data store is a persistent distributed storage and the second data store is an in-memory object store.

* * * * *